(12) United States Patent
Gammel et al.

(10) Patent No.: US 9,509,508 B2
(45) Date of Patent: *Nov. 29, 2016

(54) GENERATING A SESSION KEY FOR AUTHENTICATION AND SECURE DATA TRANSFER

(71) Applicant: Infineon Technologies AG, Neubiberg (DE)

(72) Inventors: Berndt Gammel, Markt Schwaben (DE); Wieland Fischer, Munich (DE); Stefan Mangard, Munich (DE)

(73) Assignee: Infineon Technologies AG, Neubiberg (DE)

( * ) Notice: Subject to any disclaimer, the term of this patent is extended or adjusted under 35 U.S.C. 154(b) by 278 days.

This patent is subject to a terminal disclaimer.

(21) Appl. No.: 14/074,279

(22) Filed: Nov. 7, 2013

(65) Prior Publication Data

US 2014/0169557 A1  Jun. 19, 2014

Related U.S. Application Data

(62) Division of application No. 12/797,704, filed on Jun. 10, 2010, now Pat. No. 8,861,722.

(60) Provisional application No. 61/219,930, filed on Jun. 24, 2009.

(30) Foreign Application Priority Data

Jun. 10, 2009 (DE) ........................ 10 2009 024 604

(51) Int. Cl.
*H04L 29/06* (2006.01)
*H04L 9/08* (2006.01)
(Continued)

(52) U.S. Cl.
CPC ........... *H04L 9/0869* (2013.01); *H04L 9/0668* (2013.01); *H04L 9/0637* (2013.01); *H04L 9/0866* (2013.01); *H04L 9/3242* (2013.01)

(58) Field of Classification Search
CPC ..................................................... H04L 9/0869
See application file for complete search history.

(56) References Cited

U.S. PATENT DOCUMENTS

| 3,496,291 | A | * | 2/1970 | Meisingset | ............... | H04L 9/36 380/267 |
| 3,657,699 | A | * | 4/1972 | Rocher | .................. | G11C 19/00 341/81 |

(Continued)

FOREIGN PATENT DOCUMENTS

| DE | 60208273 T2 | 8/2006 |
| DE | 60308384 T2 | 9/2007 |

(Continued)

OTHER PUBLICATIONS

Bellare et al.; Provably secure session key distribution: the three party case; Proceeding STOC '95 Proceedings of the twenty-seventh annual ACM symposium on Theory of computing; pp. 57-66; 1995; ACM Digital Library.*

(Continued)

*Primary Examiner* — Bradley Holder
(74) *Attorney, Agent, or Firm* — Murphy, Bilak & Homiller, PLLC

(57) ABSTRACT

A key-generating apparatus is provided for generating a session key which is known to a first communication apparatus and a second communication apparatus, for the first communication apparatus, from secret information which may be determined by the first and second communication apparatuses. The key-generating apparatus includes a first module operable to calculate the session key using a concatenation of at least a part of a random number and a part of the secret information, and a second module operable to use the session key for communication with the second communication apparatus.

27 Claims, 19 Drawing Sheets

(51) Int. Cl.
*H04L 9/06* (2006.01)
*H04L 9/32* (2006.01)

(56) References Cited

U.S. PATENT DOCUMENTS

| | | | | |
|---|---|---|---|---|
| 4,322,577 | A * | 3/1982 | Brandstrom | H04L 9/0618 380/29 |
| 4,325,129 | A * | 4/1982 | Groth, Jr. | H03K 5/156 327/294 |
| 4,404,426 | A * | 9/1983 | Safford | H04K 3/25 340/146.2 |
| 5,544,245 | A | 8/1996 | Tsubakiyama | |
| 5,600,720 | A * | 2/1997 | Iwamura | H04L 9/0668 380/1 |
| 5,703,952 | A * | 12/1997 | Taylor | H04L 9/0668 380/43 |
| 5,943,248 | A * | 8/1999 | Clapp | G06F 7/582 708/235 |
| 5,983,252 | A * | 11/1999 | Clapp | G06F 7/582 380/46 |
| 6,460,137 | B1 | 10/2002 | Akiyama et al. | |
| 2001/0007127 | A1* | 7/2001 | Staring | H04L 9/12 713/160 |
| 2002/0076044 | A1* | 6/2002 | Pires | H04L 9/0891 380/37 |
| 2002/0166048 | A1* | 11/2002 | Coulier | H04L 63/0435 713/169 |
| 2003/0026428 | A1 | 2/2003 | Loisel | |
| 2003/0182564 | A1* | 9/2003 | Lai | G06F 12/1408 713/193 |
| 2003/0188195 | A1* | 10/2003 | Abdo | G06F 13/107 713/169 |
| 2003/0208677 | A1* | 11/2003 | Ayyagari | H04L 63/065 713/168 |
| 2003/0217288 | A1* | 11/2003 | Guo | G06F 21/33 726/10 |
| 2004/0017916 | A1* | 1/2004 | Staddon | H04L 9/0833 380/277 |
| 2004/0103285 | A1* | 5/2004 | Nishitani | G06T 1/0028 713/176 |
| 2005/0025091 | A1* | 2/2005 | Patel | H04L 63/068 370/328 |
| 2005/0050322 | A1* | 3/2005 | Mizrah | H04L 9/0822 713/168 |
| 2005/0050328 | A1* | 3/2005 | Mizrah | H04L 9/3273 713/171 |
| 2005/0084114 | A1* | 4/2005 | Jung | H04L 9/3073 380/278 |
| 2005/0125684 | A1* | 6/2005 | Schmidt | H04L 9/30 726/27 |
| 2005/0149722 | A1* | 7/2005 | Wiseman | H04L 63/061 713/155 |
| 2005/0232426 | A1* | 10/2005 | Konersmann | H04L 63/0428 380/277 |
| 2005/0232427 | A1* | 10/2005 | Konersmann | H04L 63/0428 380/277 |
| 2005/0254658 | A1* | 11/2005 | Brown | H04L 9/0825 380/286 |
| 2006/0075259 | A1* | 4/2006 | Bajikar | H04L 63/0428 713/189 |
| 2006/0161771 | A1* | 7/2006 | Zhang | H04L 9/0844 713/168 |
| 2006/0190726 | A1 | 8/2006 | Brique et al. | |
| 2006/0193474 | A1* | 8/2006 | Fransdonk | H04L 9/0825 380/279 |
| 2006/0240802 | A1* | 10/2006 | Venkitaraman | H04W 12/04 455/411 |
| 2007/0003064 | A1* | 1/2007 | Wiseman | H04L 9/0836 380/281 |
| 2007/0058807 | A1* | 3/2007 | Marsh | G06F 21/10 380/44 |
| 2007/0060127 | A1* | 3/2007 | Forsberg | H04L 63/061 455/436 |
| 2007/0079362 | A1* | 4/2007 | Lortz | H04L 63/0807 726/5 |
| 2007/0101122 | A1* | 5/2007 | Guo | H04L 63/061 713/153 |
| 2007/0140488 | A1* | 6/2007 | Dharmaji | H04N 7/165 380/212 |
| 2007/0189512 | A1* | 8/2007 | Lee | H04L 9/065 380/28 |
| 2007/0226499 | A1* | 9/2007 | Zhang | H04L 9/0844 713/168 |
| 2008/0008322 | A1* | 1/2008 | Fontana | G06Q 20/341 380/277 |
| 2008/0114982 | A1* | 5/2008 | Bleumer | G07B 17/00733 713/171 |
| 2008/0226065 | A1* | 9/2008 | Zunke | H04L 9/0822 380/30 |
| 2008/0301436 | A1* | 12/2008 | Yao | H04L 9/321 713/155 |
| 2009/0025078 | A1* | 1/2009 | Kuehr-McLaren | H04L 63/166 726/14 |
| 2009/0204808 | A1* | 8/2009 | Guo | G06F 21/33 713/155 |
| 2009/0214028 | A1* | 8/2009 | Schneider | H04L 9/0844 380/44 |

FOREIGN PATENT DOCUMENTS

| | | |
|---|---|---|
| EP | 1282260 B1 | 12/2005 |
| EP | 1873960 A1 | 1/2008 |
| JP | 01279650 A | 11/1989 |
| JP | 07036672 A | 2/1995 |
| JP | 06350598 A | 8/1996 |
| JP | 08335040 A | 12/1996 |
| JP | 2005295164 A | 10/2005 |
| JP | 2007053612 A | 3/2007 |
| JP | 2008252299 A | 10/2008 |
| JP | 2008270907 A | 11/2008 |
| WO | 0141892 A2 | 6/2001 |
| WO | 2007004051 A1 | 1/2007 |

OTHER PUBLICATIONS

Chien et al.; A remote authentication scheme preserving user anonymity; Published in: 19th International Conference on Advanced Information Networking and Applications (AINA'05) vol. 1 (AINA papers) (vol. 2 ); Date of Conference: Mar. 28-30, 2005; pp. 245-248 vol. 2; IEEE Xplore.*

M. Medwed, et al. "Fresh Re-keying: Security against Side-Channel and Fault Attacks for Low-Cost Devices." LNCS, Progress in Cryptology—AFRICA CRYPT 2010, (May 2010) vol. 6055, pp. 279-296.

Daemen et al, "Preliminaries of the Design or Rijndael," Information Security and Cryptography, Jan. 2002, pp. 9-29.

Menezes et al, "Stream Ciphers," Handbook of Applied Cryptography, 1997, pp. 191-222, chapter 6, CRC Press, Inc.

* cited by examiner

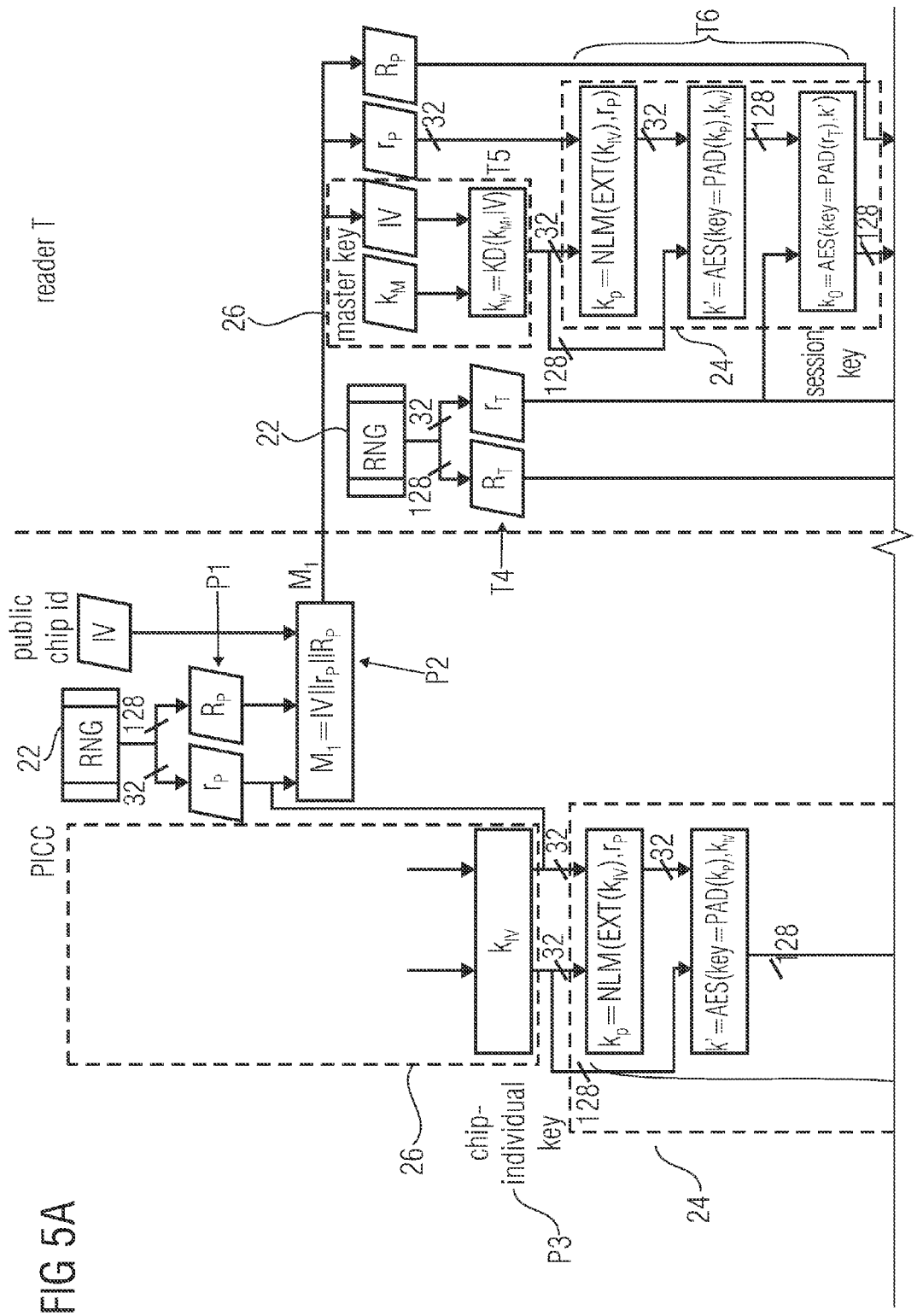

GENERATING A SESSION KEY FOR AUTHENTICATION AND SECURE DATA TRANSFER

PRIORITY CLAIM

This application is a Divisional of U.S. application Ser. No. 12/797,704 filed on 10 Jun. 2010, which in turn claims priority from German Patent Application No. 102009024604.5 filed on Jun. 10, 2009 and from U.S. Provisional Application No. 61/219,930 filed on Jun. 24, 2009, each of said applications incorporated herein by reference in their entirety.

BACKGROUND OF THE INVENTION

Embodiments of the present invention relate to generating a session key as may exemplarily be used for secure mutual authentication between two communication partners and subsequent data transfer.

Secure mutual authentication between two communication partners, such as, for example, two user terminals in the form of a reader and a contact-free data card, in a symmetrical cryptographic method may, for example, be performed using a so-called challenge-response method, like, for example, a two-way or three-way challenge-response method. A challenge-response method is a method for authenticating a communication partner on the basis of knowledge. One communication partner poses a challenge which the other one has to solve (response) so as to prove knowing certain information. Methods of this kind are generally susceptible to side-channel attacks, such as, for example, DPA (differential power analysis), EMA (electromagnetic analysis), etc. This means that an attacker is principally able to reconstruct a secret key of one of the two terminals and thus principally clone this terminal entailing relatively little effort, for example by recording current profiles (EM radiation profiles) in repeated authentication trials between the communication partners.

Hardware measures for protecting encryption on which authentication is based, such as, for example, block encryption, are relatively expensive.

SUMMARY

According to an embodiment, a device for generating a session key which is known to a first communication partner and a second communication partner, for the first communication partner, from secret information which may be determined by the first and second communication partners, includes a first module operable to calculate the session key using a concatenation of at least a part of a random number and a part of the secret information. The device also includes a second module operable to use the session key for communication with the second communication partner.

According to another embodiment, a method for generating a session key which is known to a first communication partner and a second communication partner, for the first communication partner, from secret information which may be determined by the first and second communication partners, includes acquiring a random number, calculating the session key using a concatenation of at least a part of the random number and a part of the secret information and using the session key for communication with the second communication partner.

Another embodiment may have a computer program product for performing the above method when the computer program product runs on a computer or microcontroller.

Embodiments of the present invention are based on using a protocol-based method which allows using an encryption implementation that is not protected against side-channel attacks and thus cheaper. Embodiments allow deriving a so-called "session key" which is secure against side-channel attacks. This means that a session-specific one-time key (session key) can be derived from an individual "root key" of one of the terminals in order to authenticate and secure subsequent data transfer between two communication partners. Thus, deriving the session key is based on making use of random numbers which in accordance with embodiments may be exchanged between the two communication partners. Providing the random numbers by a third party, a so-called trusted third party, is also conceivable.

Those skilled in the art will recognize additional features and advantages upon reading the following detailed description, and upon viewing the accompanying drawings.

BRIEF DESCRIPTION OF THE DRAWINGS

Embodiments of the present invention will be detailed subsequently referring to the appended drawings, in which:

FIGS. 5a and 5b show a detailed illustration of generating a session key and mutual authentication in accordance with a first embodiment of the present invention;

DETAILED DESCRIPTION OF THE INVENTION

An advantage of embodiments of the present invention is that an improved concept against side-channel attacks compared to conventional protective measures is provided.

Embodiments of the present invention allow secure mutual authentication of two communication partners which will subsequently be referred to, without limiting generality, as terminal or reader T and contact-free chip card P (proximity integrated circuit card, PICC). Generally, different configurations of the two communication partners, such as, for example, server-client configurations, are of course also conceivable. Proximity cards are generally used in close proximity of a reader, for example for paying purposes. A passive chip card, in particular a passive RFID (radio frequency identification) chip card which receives its energy from the reader, may be used. Proximity cards of this kind may exemplarily operate at frequencies of 125 kHz or 13.56 MHz.

In addition, embodiments of the present invention allow integrity protection of messages exchanged between the two communication partners T and P after authentication. Protection of the exchanged messages themselves, i.e. privacy protection, is also possible. Thus, the communication partners may, after mutual authentication in accordance with an embodiment, agree to either a data transfer mode including integrity protection or a data transfer mode including privacy protection. A prerequisite here is that common secret information may be determined by both the first and the second communication partners, similar to the so-called private key cryptography.

Figure 1:
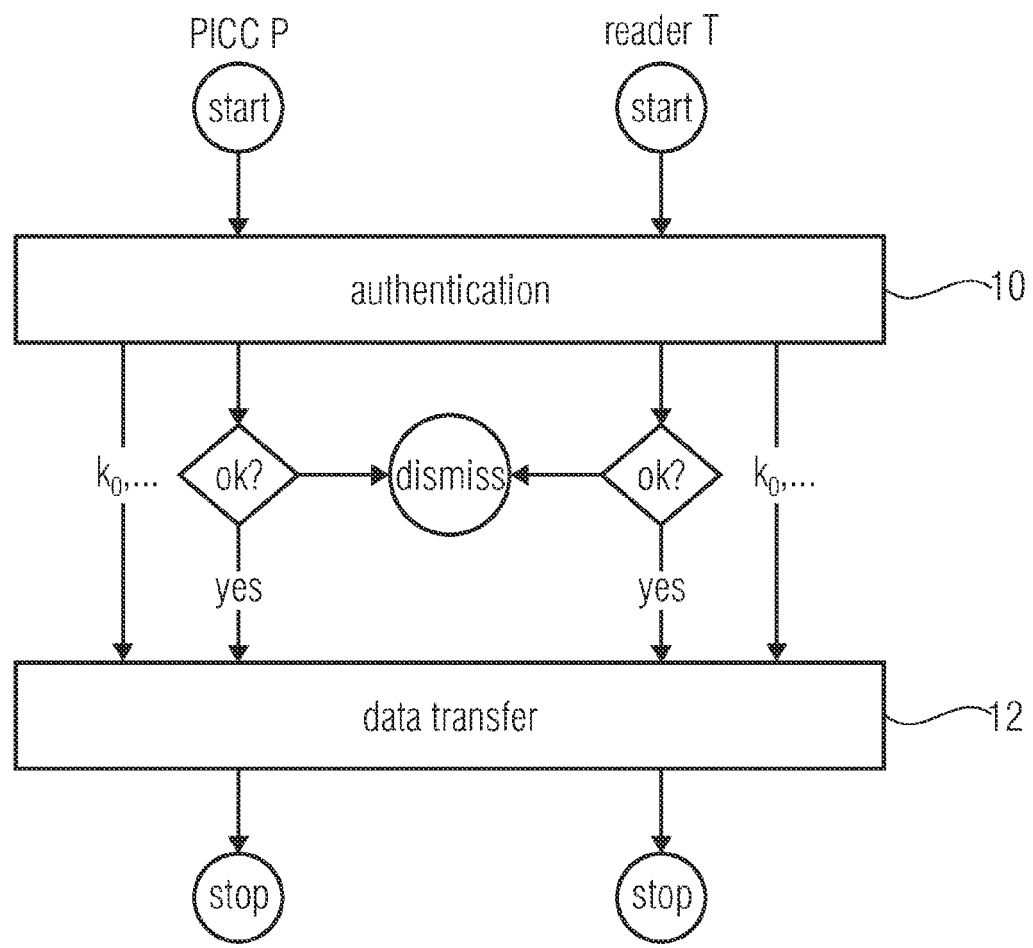
FIG. 1 shows a schematic illustration of a cryptographic protocol in accordance with an embodiment of the present invention.

FIG. 1 shows a schematic illustration of a cryptographic part of a communication protocol in accordance with an embodiment of the present invention. The cryptographic part of the protocol consists of two parts: authentication 10 and subsequent data transfer 12.

During authentication 10, the two communication partners P and T authenticate each other. In accordance with embodiments, this may take place using a three-way challenge-response protocol. The result of authentication 10 is either acceptance or rejection of the respective other communication partner. In the case of acceptance, a common temporary secret, a so-called session key $k_0$, and maybe additional information needed for subsequent data transfer 12, result from the authentication 10 of a common temporary secret.

After successful authentication 10, the first communication partner P may release parts of its memory for access by the second communication partner T. Thus, the second communication partner T is able to read and/or write certain data blocks for which it is in possession of corresponding access rights. Thus, P can read/write from/to P's non-volatile memory (NVM). The commands for this may originate from the second communication partner T. This applies in particular for embodiments in which the first communication partner P is a contact-free chip card and the second communication partner T is a reader.

In accordance with embodiments, there are two measures for securing data transfer 12: A data integrity protection mechanism, called MAC (message authentication code) mode; and a privacy protection mechanism, called encryption mode.

In accordance with embodiments, only one of the protection modes can be used at a certain time for data transfer 12 between the two communication partners P and T. The protection of the data transfer 12 is bound to the authentication 10 by the session key $k_0$ determined during previous authentication.

For integrity protection, the session key $k_0$ is, in accordance with embodiments, used as a basic key to generate so-called message authentication codes (MACS), i.e. check parts for authenticating a message sent.

For privacy protection, the session key $k_0$ is used as a basic key for encrypting data packages transmitted.

After having shown an overview of the inventive concept using FIG. 1, embodiments of the present invention are to be described in greater detail using the other figures.

Figure 2A:
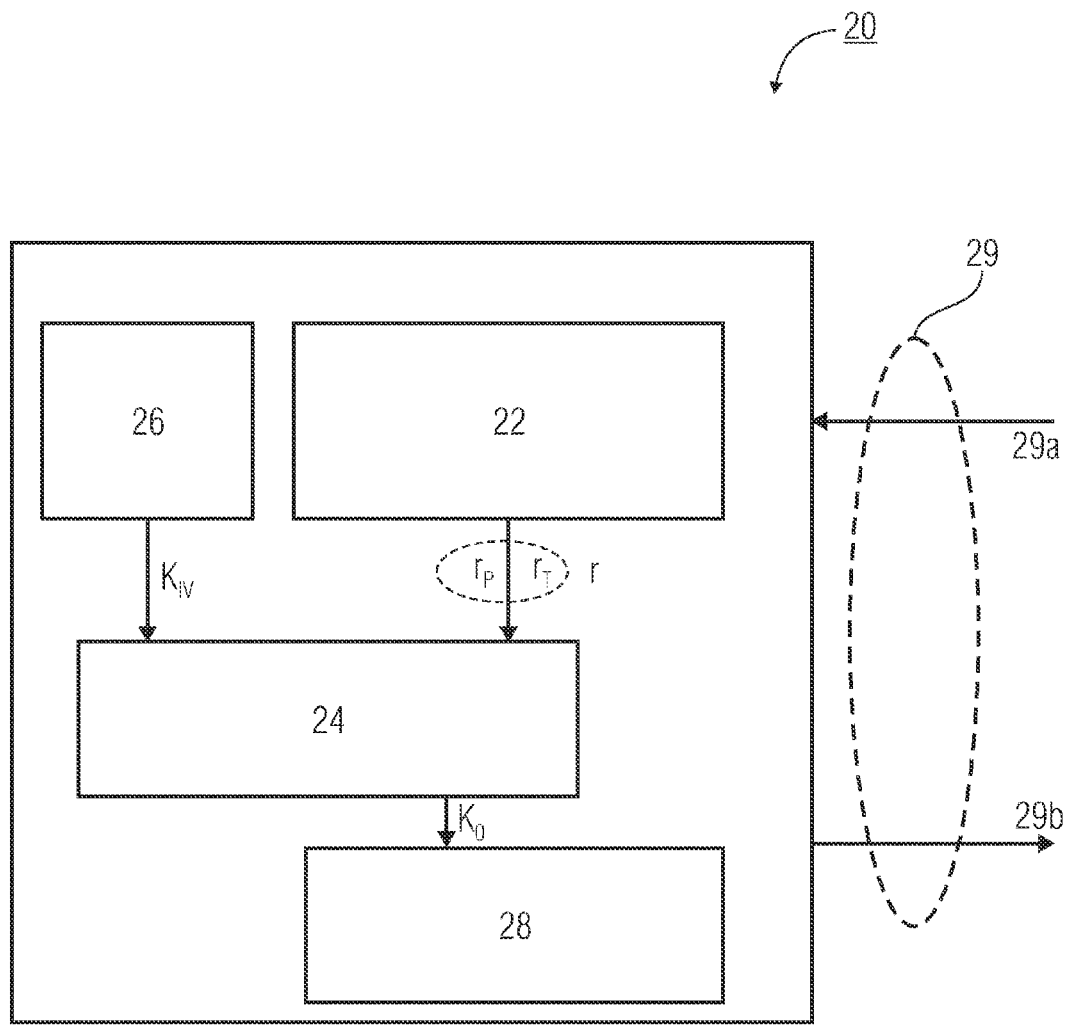
FIG. 2A shows a block diagram of a device for generating a session key in accordance with an embodiment of the present invention.

FIG. 2A is a schematic illustration of a device 20 for generating a session key $k_0$ which is known to a first communication partner and a second communication partner, for the first communication partner. Thus, the session key $k_0$ is generated from secret information $k_{IV}$ which may be determined by the first and second communication partners. Here, the device 20 is associated to the first communication partner. Which of the two communication partners P and T looked at here is referred to as the first and the second communication partners is irrelevant.

The device 20 includes means 22 for obtaining a random number r. At least a part $r_P$ or $r_T$ of the random number r may be fed to means 24 for calculating the session key $k_0$ using a concatenation of the at least one part of the random number and a part of the secret information $k_{IV}$. Means 26 is provided for obtaining the secret information $k_{IV}$. The session key $k_0$ calculated may then be used by means 28 for communicating with the second communication partner (not shown). An interface 29 having an input 29a and an output 29b is provided for communication with the second communication partner.

Figure 2B:
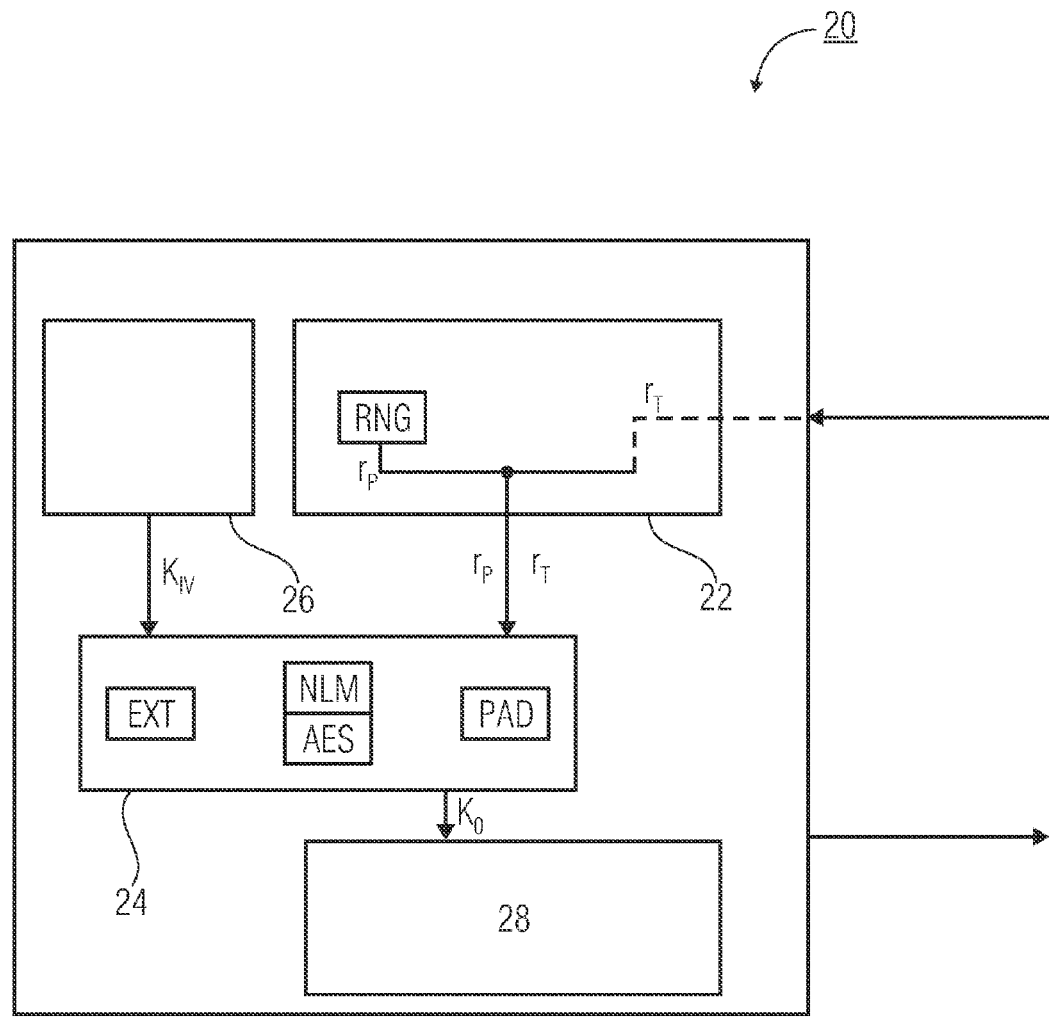
FIG. 2B shows a block diagram of a device for generating a session key in accordance with another embodiment of the present invention.

Depending on which communication partner the device 20 for generating the session key $k_0$ is used in, different requirements may result for the individual blocks or means of the device 20. When the device 20 is exemplarily used in a proximity card P, in accordance with embodiments, different resources are provided so as to ensure secure authentication and secure data transfer between P and T. A block diagram of a device 20 integrated in a proximity card P is shown in FIG. 2B.

The means 26 for obtaining the secret information $k_{IV}$ is, in accordance with this embodiment, configured to provide a chip-individual identification IV of the first communication partner, i.e. exemplarily of the proximity card P, and to derive the secret information $k_{IV}$ therefrom. This may take place in a manufacturer-specific manner.

The means 22 for obtaining the random number, in accordance with embodiments, includes a cryptographic random number generator RNG as a hardware module. At least a part $r_P$ of the random number r can be generated by same.

In accordance with an embodiment, the means 24 for calculating the session key $k_0$ includes a hardware module for encryption and/or decryption. This may be block encryption, in particular block encryption in accordance with the AES (Advanced Encryption Standard). The concatenation of at least a part $r_P$ of the random number and the part of the secret information $k_{IV}$ may be performed, on the part of a contact-free chip card P, by a hardware module NLM. The concatenation in accordance with an embodiment is a non-linear concatenation or map (NLM).

Figure 2C:
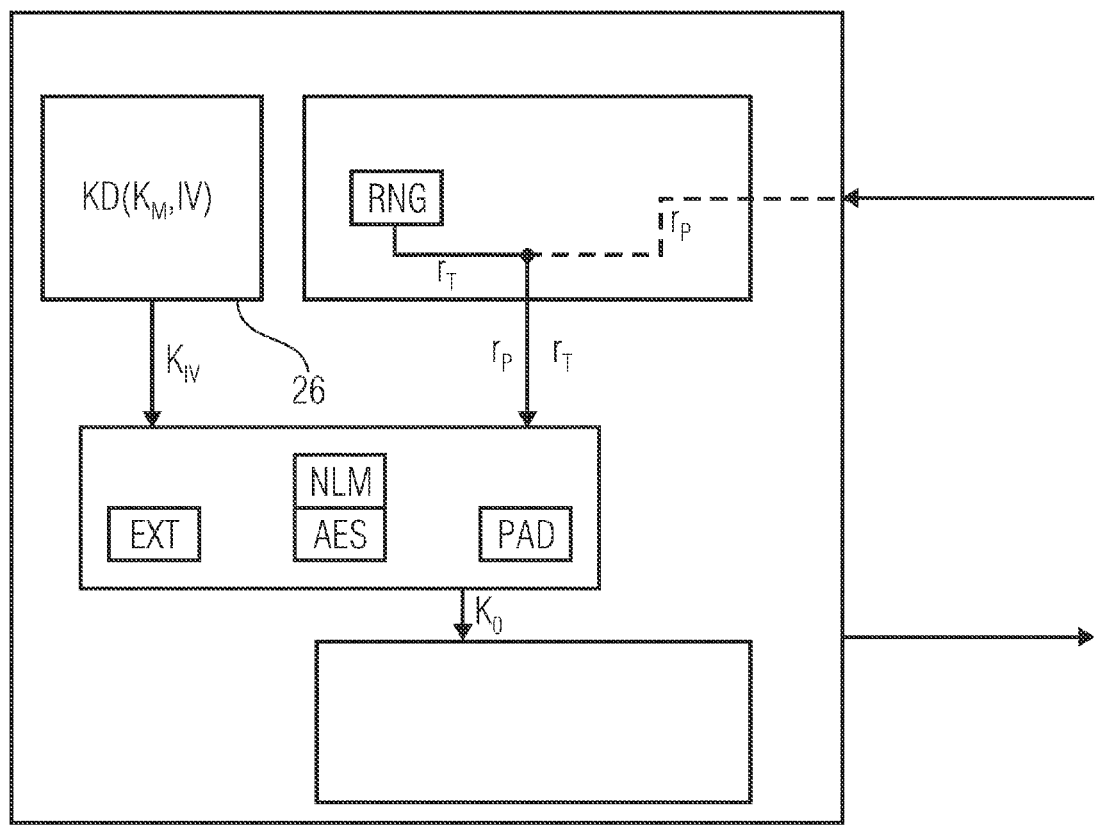
FIG. 2C shows a block diagram of a device of a session key in accordance with still another embodiment of the present invention.

Generally, it may be assumed that a reader T is located in surroundings protected against attacks. Thus, less security-relevant requirements are to be imposed on the hardware implementation of a reader. Considering the schematic setup, a device 20 for generating the session key $k_0$ integrated on the part of a reader T does not differ from a device 20 for generating the session key $k_0$ included on the part of a chip card P. In accordance with embodiments, the secret information $k_{IV}$ is only obtained on the part of the reader T in a different manner, which is why there may be fundamental differences between the communication partners with regard to the means 26. This is shown in FIG. 2C.

On the part of a reader T, the means for obtaining the secret information $k_{IV}$ may be configured to obtain the secret information $k_{IV}$ based on an apparatus-specific identification IV of the chip card P and a general key $k_M$. Thus, the general key $k_M$ and the apparatus-specific identification IV may be fed to a key-extracting function KD in order to determine $k_{IV}$.

Figure 3:
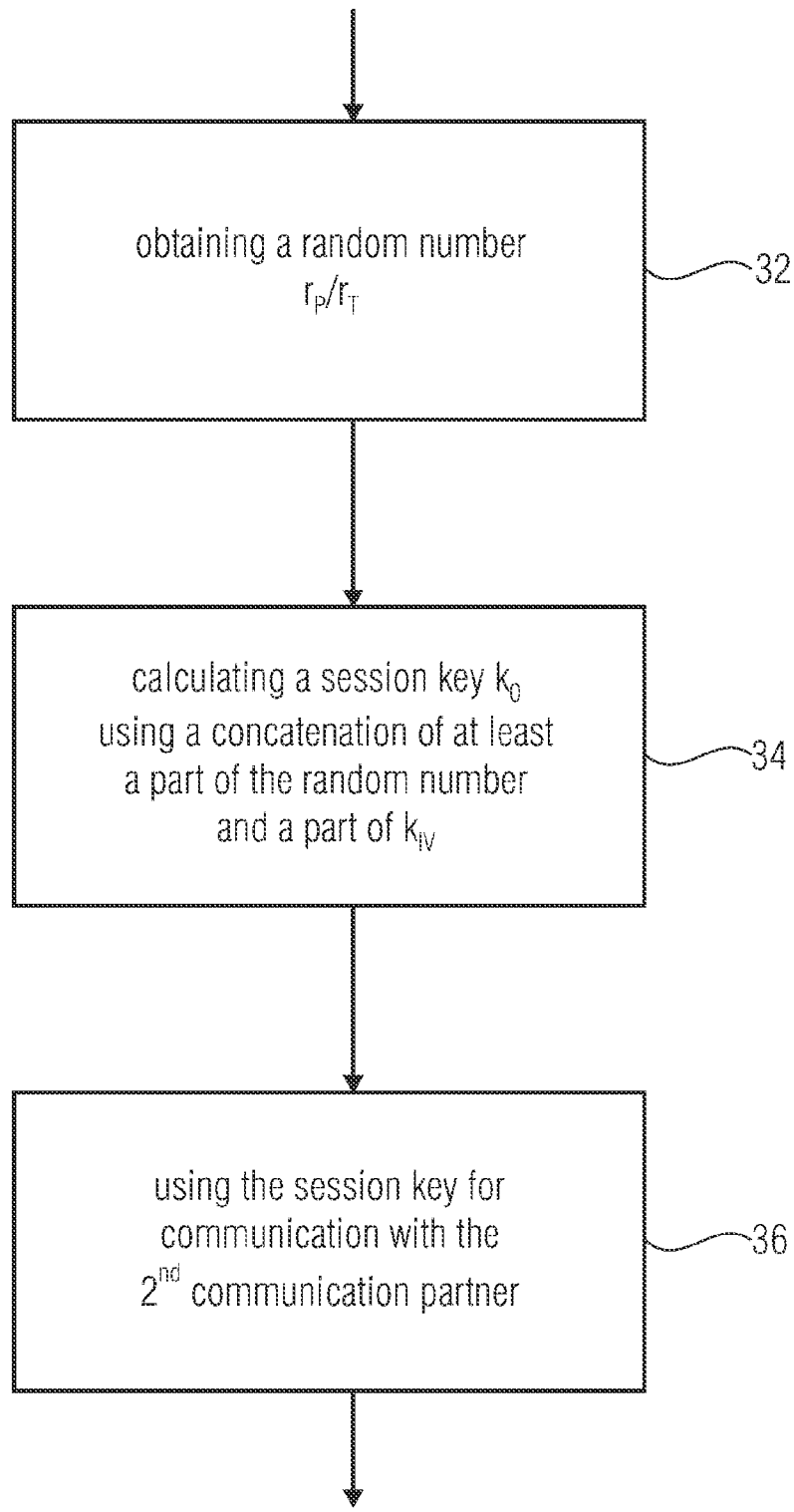
FIG. 3 shows a flowchart of a method for generating a session key in accordance with an embodiment of the present invention.

Before discussing an embodiment of an inventive method for generating a session key in greater detail, a rough overview of the method steps will be given making reference to FIG. 3.

The individual method steps here may be performed by each one of the two communication partners. The method steps, however, may also be distributed differently to the two communication partners. Finally, it is also conceivable for a third trusted identity to perform the method steps.

In a first step 32, a random number r or a part thereof is obtained. In a second step 34, the session key $k_0$ is calculated using a concatenation of at least a part of the random number and a part of the secret information $k_{IV}$. Subsequently, in a third step 36, the calculated session key $k_0$ is used for communication between the two communication partners P and T.

The following mathematical notation is used for the detailed description which follows:

Mathematical equality of two expressions x and y is expressed by:

$$x=y, \quad (1)$$

wherein an assignment of a value x to a variable y is written as:

$$y:=x. \quad (2)$$

A concatenation z of two binary numbers x and y is:

$$z:=x\|y. \quad (3)$$

An addition modulo 2 or a bit-wise exclusive-OR of two binary numbers x and y is written as:

$$z:=x \text{ XOR } y \quad (4)$$

An encryption of a $2^x$-bit data block m using a $2^y$-bit key k is expressed as follows:

$$c:=\text{AES}(\text{key}=k,m) \quad (5)$$

wherein embodiments of the present invention provide for block encryption, in particular an encryption in accordance with the AES standard. Correspondingly, a decryption is denoted by:

$$m:=\text{AES}^{-1}(\text{key}=k,c) \quad (6)$$

wherein this may be block decryption in accordance with the AES standard.

Figure 4:
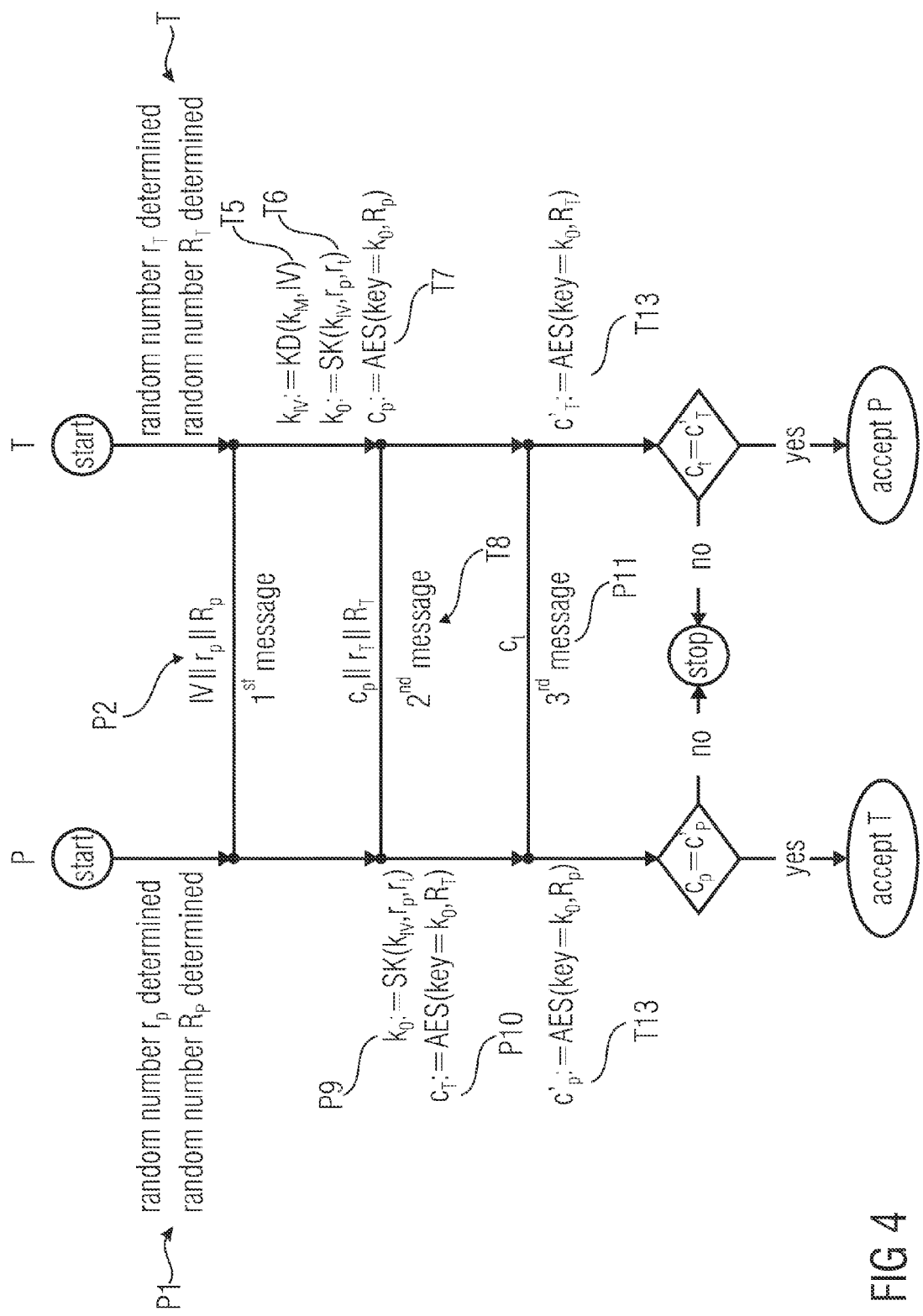
FIG. 4 shows an illustration of a flow of an authentication protocol in accordance with an embodiment of the present invention.

A flowchart for generating the session key $k_0$ and mutual authentication of the two communication partners P and T in accordance with an embodiment of the present invention is shown in the flow/sequence chart of FIG. 4.

Subsequently, detailed explanations will be given regarding every step taken on the part of the first communication partner P and the second communication partner T, taking an order of execution of the individual steps into consideration. For the embodiment illustrated in FIG. 4, the described order of the individual steps is important. The steps here are referred to by P0, P1, ..., n and T0, T1, ... Tn, respectively, P indicating the first communication partner, T indicating the second communication partner and the indices n referring to the temporal order. Steps which may be executed simultaneously or which may be exchanged so as to make implementation easier will be highlighted explicitly. For the sake of a simplified illustration, every step will be given a name.

P1: Generating a Random Number on the Part of the First Communication Partner P:

The on-chip random generator RNG can be started to generate two random numbers $r_P$ and $R_P$ in accordance with one embodiment. $R_P$ may have a width of 128 bits in accordance with embodiments and be sent to the second communication partner T as a so-called "challenge". In accordance with one embodiment, $r_P$ has a width of 32 bits and may be used for calculating the session key $k_0$. $R_P$ and $r_P$ are assumed to be binary numbers including independently and uniformly distributed random bits. In accordance with one embodiment, the means 22 for obtaining the random number is adapted to determine at least a first part of the random number in a random or pseudo-random manner.

P2: First Message from the First Communication Partner P to the Second Communication Partner T:

In accordance with embodiments, the first communication partner P concatenates its apparatus identification IV, the P-side session key random value $r_P$ and the P-side random challenge $R_P$ to form a first message $M_1$ which is transferred to the second communication partner T:

$$M_1:=IV\|r_P\|R_P. \quad (11)$$

This means that, after receiving the random numbers $r_P$ and $R_P$, $r_P$ is transferred to the second communication partner T together with $R_P$ and the apparatus-specific identification IV.

P3: Determining the Secret Information $k_{IV}$ on the Part of the First Communication Partner P:

The secret information $k_{IV}$ may be obtained on the part of P by manufacturer-specific measures which protect the secret information $k_{IV}$ from attacks.

T4: Generating a Random Number on the Part of the Second Communication Partner T:

The means 22 for obtaining the random number or the random number generator RNG on the part of the second communication partner T may be started so as to obtain two random numbers $r_T$ and $R_T$. Thus, $R_T$ may in accordance with embodiments have a width of 128 bits and serve as a "challenge" which is transmitted to the first communication partner P. $r_T$ may in accordance with embodiments have a width of 32 bits and be used for calculating the session key $k_0$. $R_T$ and $r_T$ both include independently and uniformly distributed random bits.

T5: Determining the Secret Information $k_{IV}$ on the Part of the Second Communication Partner T:

After receiving the first message $M_1$ of the first communication partner P (step P2), the second communication partner T may derive the secret information, i.e. the individual secret key $k_{IV}$ of the first communication partner, for example from a general key $k_M$ together with the apparatus-specific identification IV obtained by means of a key derivation function KD:

$$k_{IV} := KD(k_M, IV). \quad (14)$$

A definition of the key derivation function KD may be manufacturer-specific and thus have no influence on the inventive protocol. On the part of the reader T, the secret information $k_{IV}$ may thus be determined by means of a key derivation function KD based on a general key $k_M$ and a transferred apparatus-specific identification IV of the chip card P.

T6: Calculating the Session Key $k_0$ on the Part of the Second Communication Partner T:

The session key $k_0$ is calculated using a concatenation SK of at least a part of the random number and a part of the secret information $k_{IV}$. Thus, $x=(x_0, x_1, \ldots, x_{127}) \in GF(2)^{128}$ and $y=(y_0, x_1, \ldots, y_{31}) \in GF(2)^{32}$, $GF(2)^n$ denoting a Galois body, i.e. a quantity having a finite number of $2^n$ elements on which the basic operations of addition, subtraction, multiplication and division are defined. Thus, the following function $$EXT: GF(2)^{128} \to GF(2)^{32} \quad (15)$$

generally means an extraction of any 32 bits of a 128-bit value. In accordance with embodiments, the 32 least significant bits are extracted. The following function $$PAD: GF(2)^{32} \to GF(2)^{128} \quad (16)$$

however refers to generally any padding of a 32-bit value to form a 128-bit value. This means that PAD refers to a bit padding rule. In accordance with embodiments, a 32-bit value is padded by zeros to form a 128-bit value.

In accordance with one embodiment, the second communication partner T calculates a common and unique session key $k_0$ in accordance with $k_0 = SK(k_{IV}, r_P, r_T)$. Thus, SK means a concatenation of $k_{IV}$ and at least one part $(r_P, r_T)$ of a random number r in the form of a session key calculating function. In accordance with one embodiment, the session key may be calculated as follows:

SK:

$$k_P := NLM(EXT(k_{IV}), r_P), \quad (17)$$

$$k' := AES(key = PAD(k_P), k_{IV}), \quad (18)$$

$$k_0 := AES(key = PAD(r_T), k'). \quad (19)$$

This means that in a first sub-step (equation 17) a non-linear map or concatenation of 32 bits of the secret information $k_{IV}$ and the 32-bit random value $r_P$ may be formed in accordance with $k_P := NLM(EXT(k_{IV}), r_P)$, wherein:

$$NLM: GF(2)^{32} \times GF(2)^{32} \to GF(2)^{32},$$

$$z = NLM(x, y) \quad (20)$$

applies, which means that in accordance with embodiments, the means 24 for calculating the session key $k_0$ is adapted to calculate the session key using a non-linear concatenation NLM of at least one part $r_P$ of the random number and the part EXT ($k_{IV}$) of the secret information $k_{IV}$. One object of the non-linear concatenation NLM is concatenating the chip-individual secret $k_{IV}$ and the publicly accessible random number $r_P$ such that no information regarding $k_{IV}$ can be obtained by means of a side channel or DPA attack. In accordance with embodiments, the 128-bit secret $k_{IV}$ and the 32-bit random variable $r_P$ are combined to form a random 32-bit session key precursor value $k_P$. The final session key $k_0$ may then be determined based on the precursor value $k_P$. Formally, the non-linear concatenation may be defined in accordance with equation (20). Since $k_P$ in accordance with embodiments is the only random basis for the session key $k_0$, in accordance with the example described here, a maximum of $2^{32}$ different session keys can be generated. Thus, it is sufficient to use only 32 bits of $k_{IV}$ as an input to the non-linear concatenation NLM. Of course, any other number of bits may be used, such as, for example, 16, 64, 128, etc.

A non-linear feedback shift register (NLFSR) may be used as a highly efficient implementation of the non-linear concatenation NLM. It is characteristic of a non-linear feedback shift register that it retains a zero state, i.e. a state in which all register cells are initialized using zeros. With exemplarily 32 register cells, every initial state different to zero will repeat after exactly $2^{32}-1$ clock cycles. In other words, a state of the shift register, if operated autonomously, repeats itself with a period of $2^{32}-1$.

Figure 15A:
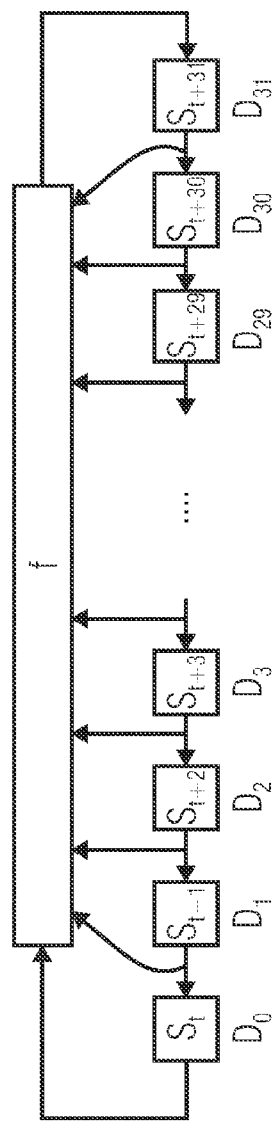
FIG. 15A shows a schematic illustration of an autonomous non-linear feedback shift register in accordance with an embodiment of the present invention.

A schematic illustration of a potential implementation of a non-linear feedback shift register in accordance with an embodiment of the present invention is shown in FIG. 15A.

The entire contents of 32 register cells $D_0$ to $D_{31}$ are fed to the function f. After each clock, contents of a register cell can be passed on to a neighboring register cell, as is indicated by the arrows shown in FIG. 15A. This means that the contents of the register cell D1 are passed on to the register cell D0, the contents of the register cell D2 are passed on to the register cell D1, etc. The result of the function f is written to the register cell $D_{31}$ after same has passed on its previous value to the cell $D_{30}$.

Figure 15B:
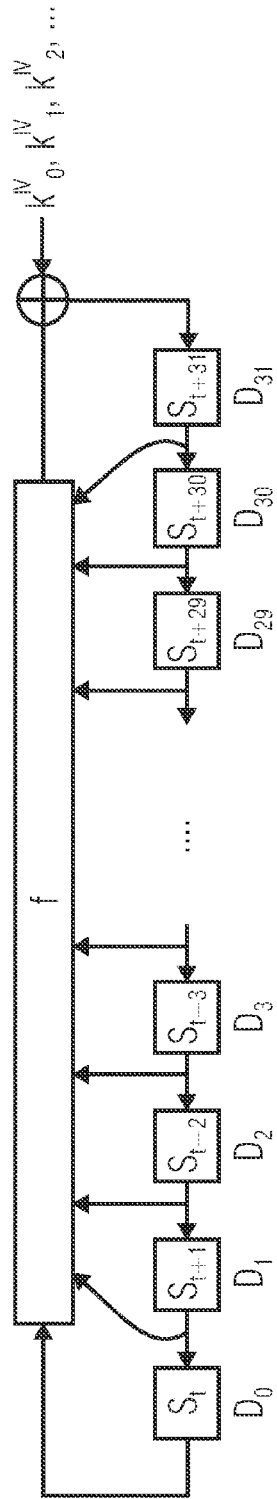
FIG. 15B shows a schematic illustration of a non-linear feedback shift register including coupling-in in accordance with an embodiment of the present invention.

One potential calculation of the non-linear concatenation NLM using the NLFSR, in accordance with one embodiment, implies the following steps:

1. Setting the initial state of the NLFSR:
   Loading $r_P[0 \ldots 31]$ in the register cells $D[0 \ldots 31]$.
2. Inserting the part of the secret information:
   The part of the secret information $k_{IV}[0 \ldots 31]$ is sequentially coupled into the NLFSR in accordance with the following order $k_{IV}[0], k_{IV}[1], k_{IV}[2], \ldots, k_{IV}[31]$, as is illustrated in FIG. 15B. Thus, the NLFSR is clocked after each coupling-in step. This means that inserting the part $k_{IV}[0 \ldots 31]$ takes $T_{SIK}=32$ clock cycles.
3. Concatenation:
   The NLFSR is clocked autonomously for a time $T_{Mix}=64$ cycles. This means that during this time $T_{mix}$, there is nothing to be inserted or coupled into the register. After 64 clock cycles, the register contents $T[0 \ldots 31]$ form the session key precursor value $k_P$.

In accordance with another embodiment of the present invention, the non-linear concatenation NLM may, instead of using a non-linear feedback shift register, also be realized based on an irreproducible polynomial f(X), i.e. a polynomial which cannot be written as a product of two non-trivial polynomials.

With $x=(x_0, x_1, \ldots, x_{31})$, $y=(y_0, y_1, \ldots, y_{31})$, $z=(z_0, z_1, \ldots, z_{31})$, $z=\text{NLM}(x,y)$ may exemplarily be determined in accordance with $$z_{31}X^{31}+\ldots+z_1X^1+z_0=(x_{31}X^{31}+\ldots+x_1X^1+x_0)*\\(y_{31}X^{31}+\ldots+y_1X^1+y_0)\bmod f(X) \quad (21)$$

or, expressed in short, $z=x*y \bmod f$. Since this is a multiplication within a finite body $GF(2^{32})$, $\text{NLM}(x,\text{NLM}(y_1,y_2))=\text{NLM}(\text{NLM}(x,y_1), y_2)$ applies here. For this reason, an implementation of equation (17) in accordance with:

$$r_P:=\text{NLM}(r_1,r_2), \quad (22)$$

$$k'_P:=\text{NLM}(\text{EXT}(k_{IV})\cdot r_1), \quad (23)$$

$$k_P:=\text{NLM}(k'_P,r_2) \quad (24)$$

can be protected against DPA attacks if $\text{EXT}(k_{IV}) \neq (0, 0, \ldots, 0)$. In accordance with this embodiment, the non-linear concatenation in accordance with equation (17) is split up into two non-linear concatenations in accordance with equations (23) and (24). Thus, in an alternative embodiment of step P1, the random number generator RNG generates three random values $r_1$, $r_2$ and $R_P$. $R_P$ may in accordance with embodiments have a width of 128 bits and is sent to the second communication partner T as a so-called "challenge". $r_1$ and $r_2$ may each have a width of 32 bits and are used for calculating the session key $k_0$. $R_P$ and $r_1$, $r_2$ are assumed to be binary numbers having independently and uniformly distributed random bits. The first communication partner P calculates $r_P:=\text{NLM}(r_1, r_2)$ and stores $r_1$ and $r_2$ in a temporary storage.

One realization of NLM including the irreproducible polynomial $f(X)$ in accordance with one embodiment mainly uses a linear feedback shift register (LFSR) which is defined by the polynomial $f(X)$ together with a second register which contains the first argument x of the function $z=\text{NLM}(x,y)$. Thus, the second register is coupled to the LFSR by logical AND and XOR gates. The value z may exemplarily be calculated as follows:
1. Setting all register cells of the LFSR to zero
2. Loading register cells $X_i$ of the second register with the value $x_i$ (i=0, ... 31)
3. Coupling the values $y_{31}, y_{30}, \ldots, y_0$ into the AND gates for a time T=32 clock cycles so as to concatenate y and x
4. After 32 clock cycles, the register contents of the LFSR form the value $z=(z_0, z_1, \ldots, z_{31})$.

This means that the means 24 for calculating the session key $k_0$ in accordance with one embodiment is adapted to implement the non-linear concatenation NLM using a linear feedback shift register which is defined by an irreproducible polynomial $f(X)$ so that a result of the non-linear concatenation (NLM) is dependent on a modulo operation of a multiplicative concatenation of the at least one part of the random number and the part of the secret information $k_{IV}$ including the irreproducible polynomial $f(X)$ (cf. equation 23 in connection with equation 21).

A significant reduction of side-channel leaks can be achieved during generating the session key $k_0$ by means of an adequate implementation of the non-linear concatenation NLM to the extent that DPA attacks will be almost impossible, even for experienced attackers. Furthermore, calculating the session key $k_0$ may be accelerated by the non-linear concatenation NLM.

In a step following the non-linear concatenation NLM, secret information $k_{IV}$ is concatenated with the session key precursor value $k_P$ in accordance with equation (18). Thus, the concatenation AES (.,.) is an encryption algorithm. In accordance with embodiments, the encryption algorithm AES is a block encryption or block cipher. In particular, block encryption in accordance with the so-called Advanced Encryption Standard (AES) may be used. This means that, in accordance with embodiments, means 24 for calculating the session key $k_0$ is adapted to use a value $k_P$ derived from the non-linear concatenation NLM as a key for an encryption AES so as to encrypt the secret information $k_{IV}$ or a value derived therefrom and obtain the session key $k_0$ based on that encryption.

In accordance with embodiments, it is also possible for only the first communication partner P to determine a random number $r_P$, but not the second communication partner T. In this case, the value k' resulting from the encryption in accordance with equation (18) would already be the session key.

In the embodiment discussed here, the encryption in accordance with equation (18), however, can be improved by the second random number $r_T$ by concatenating, in a third step (equation 19), the intermediate result k' and the second random value $r_T$ in accordance with:

$$k_0:=\text{AES}(\text{key=PAD}(r_T),k') \quad (22)$$

so as to finally obtain the common session key $k_0$. When uniting equations (17)-(19), the means 24 for calculating the session key $k_0$ in accordance with embodiments is adapted to calculate the session key $k_0$ based on:

$$k_0=\text{AES}(\text{PAD})r_T),(\text{AES}(\text{PAD}(\text{NLM}(\text{EXT}(k_{IV}),r_P)),\\k_{IV})) \quad (23)$$

$r_P$ being a first random number, $r_T$ being a second random number and $k_{IV}$ indicating the secret information, wherein NLM (.,.) corresponds to the non-linear concatenation, EXT (.) to an extraction rule, PAD (.) to a bit padding rule and AES (.,.) to a block encryption in accordance with the Advanced Encryption Standard.

Furthermore, it is conceivable for the steps in accordance with equations (18) and (19) to be substituted by a single encryption step, exemplarily in accordance with:

$$k_0:=\text{AES}(\text{key=PAD2}(k_P), \text{XOR PAD}(r_T),k_{IV}) \quad (24)$$

wherein the following function:

$$\text{PAD2}: GF(2)^{32} \rightarrow GF(2)^{128} \quad (25)$$

means padding a 64-bit value resulting from doubling the 32 bits of the input value y. In particular, the 64-bit value can be padded using zeros.

This means that, in accordance with one embodiment, means 22 for obtaining the random number is adapted to determine a first random number $r_P$ in a random or pseudo-random manner and to obtain a second random number $r_T$ from the other communication partner. The means 24 for calculating the session key $k_0$ is adapted to calculate the session key $k_0$ based on an encryption AES of a value derived from the secret information $k_{IV}$ with a key derived from the first and second random numbers $r_P$ and $r_T$. In accordance with another embodiment, the means 22 for obtaining the random number is adapted to determine a first random number $k_P$ based on a non-linear concatenation NLM of a random number $r_P$ determined in a random or pseudo-random manner, or a value derived therefrom, and a part $\text{EXT}(k_{IV})$ of the secret information $k_{IV}$ and to obtain a second random number $r_T$ from the other communication partner. The means 24 for calculating the session key $k_0$ is adapted to calculate the session key $k_0$ based on an encryption AES of a value derived from the secret information $k_{IV}$ with a key derived from the first and second random numbers $k_P$ and $r_T$ (cf. equation 24).

T7: Response Calculation on the Part of the Second Communication Partner T

In step T7, the second communication partner T calculates a "response" $c_P$ to the "challenge" $R_P$ of the first communication partner P, the session key of step T6 being used here:

$$c_P := AES(key=k_0, R_P) \quad (26)$$

T8: Second Message from the Second Communication Partner T to the First Communication Partner P In step T8, the response $c_P$ calculated in step T7, the random value $r_T$ determined on the part of the second communication partner T and the random challenge $R_T$ are concatenated to form a second message $M_2$ on the part of the second communication partner T. This message $M_2$ is transferred from the second communication partner T to the first communication partner P:

$$M_2 := c_P \| r_T \| R_T. \quad (27)$$

This means that the second communication partner T, in accordance with one embodiment, at first determines a response to the challenge $R_P$ of the first communication partner P (equation 26) based on a concatenation AES of $k_0$ and $R_P$ using a cryptographic algorithm and then transmits same, together with the second random number $r_T$ and the random challenge $R_T$, to the first communication partner P.

P9: Calculating the Session Key $k_0$ on the Part of the First Communication Partner P:

After the first communication partner P has received the second message $M_2$ including the second random number $r_T$, the common session key can also be calculated on the part of the first communication partner P in accordance with $k_0 = SK(k_{IV}, r_P, r_T)$ by the first communication partner P performing the same three steps like the steps of the second communication partner T already described in connection with equations (17)-(19):

$$k_P = NLM(EXT(k_{IV}), r_P), \quad (28)$$

$$k' = AES(key=PAD(k_P), k_{IV}), \quad (29)$$

$$k_0 = AES(key=PAD(r_T), k'). \quad (30)$$

The first two steps, i.e. calculating $k_P$ and $k'$, may be executed already before receiving the second message $M_2$. It is to be mentioned here again that the third step, i.e. calculating $k_0$ in accordance with equation (30), only has to be performed when exemplarily the second random number $r_T$ is determined on the part of the second communication partner T. As mentioned before, embodiments of the present invention also include those cases in which a random number is determined in a random manner only on the part of the first communication partner P or by a trusted third party and provided to the communication partners P, T. The step in accordance with equation (30) thus serves for additionally increasing the security of key calculation. In accordance with the embodiment described here, the means 22 for obtaining the random number on the part of P is also adapted to determine a first random number $r_P$ in a random or pseudo-random manner and to obtain a second random number $r_T$ before the second communication partner T. The means 24 for calculating the session key $k_0$ is adapted to obtain the session key $k_0$ based on a second encryption (equation 30) of a value $k'$ derived from a first encryption (equation 29) with a value derived from the second random number $r_T$, wherein a value $k_P$ derived from a non-linear concatenation (equation 28) of the first random number $r_P$ and the part of the secret information $k_{IV}$ is used as the key for the first encryption in order to encrypt the secret information or a value derived therefrom and to obtain the session key $k_0$ based on the first and second encryptions.

As already described before, it is also possible for the steps in accordance with equations (18) and (19) or equations (29) and (30) to be substituted by a single encryption step, for example in accordance with:

$$k_0 := AES(key=PAD2(k_P), XOR\ PAD(r_T), k_{IV}). \quad (31)$$

In the case of NLM being based on the irreproducible polynomial f(X), calculating the session key $k_0$ on the part of the first communication partner P in accordance with one embodiment may also be done in accordance with:

$$k'P := NLM(EXT(kIV), r1), \quad (32)$$

$$kP := NLM(k'P, r2) \quad (33)$$

$$k_0 := AES(key=PAD2(k_P) XOR\ PAD(r_T), k_{IV}). \quad (34)$$

P10: Response Calculation on the Part of the First Communication Partner P:

In step P10, the first communication partner P in accordance with one embodiment calculates a response $c_T$ to the challenge $R_T$ of the second communication partner T based on the common session key $k_0$ which was calculated in step P9:

$$c_T := AES(key=k_0, R_T). \quad (35)$$

This means that the session key $k_0$ is used as a key for block encryption in accordance with the AES standard to encrypt the challenge $R_T$ of the second communication partner T and thus obtain the response cp.

P11: Third Message (from the First Communication Partner P to the Second Communication Partner T):

In step P11, the first communication partner P sends the response $c_T$ calculated in step P10 to the second communication partner T.

P12: Response Verification on the Part of the First Communication Partner P:

Here, the random challenge $R_P$ having been sent to the second communication partner T by means of the first message $M_1$ is encrypted on the part of the first communication partner P using the session key $k_0$ in accordance with:

$$c_P' = AES(key=k_0, R_P) \quad (36)$$

in order to obtain a response comparative value $c_P'$. Then, the response comparative value $c_P'$ obtained is compared on the part of the first communication partner P to the response $c_P$ having been obtained by the second message $M_2$ from the second communication partner T. If $c_P' = c_P$, the second communication partner T can be authenticated successfully on the part of the first communication partner P. Otherwise, authentication will fail. When authentication fails, further communication between the two communication partners P, T is to be stopped. Failing authentication may be signaled to the second communication partner T.

T13: Response Verification on the Part of the Second Communication Partner T:

Here, the random challenge $R_T$ having been sent to the second communication partner P using the second message $M_2$ is encrypted on the part of the second communication partner T using the session key $k_0$ in accordance with:

$$c_T' = AES(key=k_0, R_T) \quad (37)$$

in order to obtain a response comparative value $c_T'$. Then, the response comparative value $c_T'$ obtained is compared to the response $c_T$ having been obtained by the second communication partner T by the third message $M_3$ (step P11) on the part of the second communication partner T. If $c_T' = c_T$, the first communication partner P may be authenticated successfully on the part of the second communication partner T. Otherwise, authentication will fail. When authentication fails, further communication between the two communication partners P, T is to be stopped. Failing authentication may be signaled to the first communication partner P.

Figure 5B:
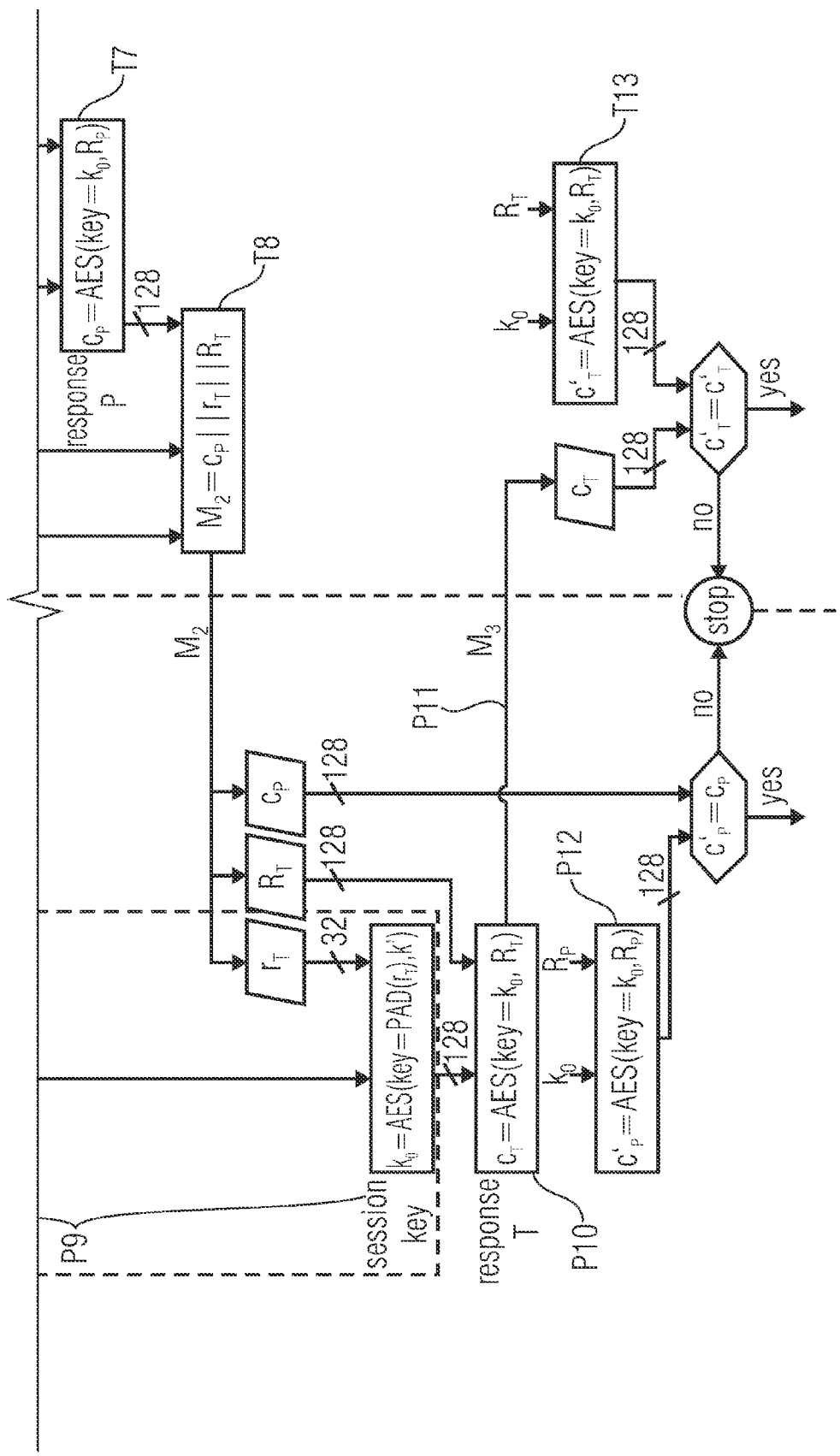
Figure 5C:
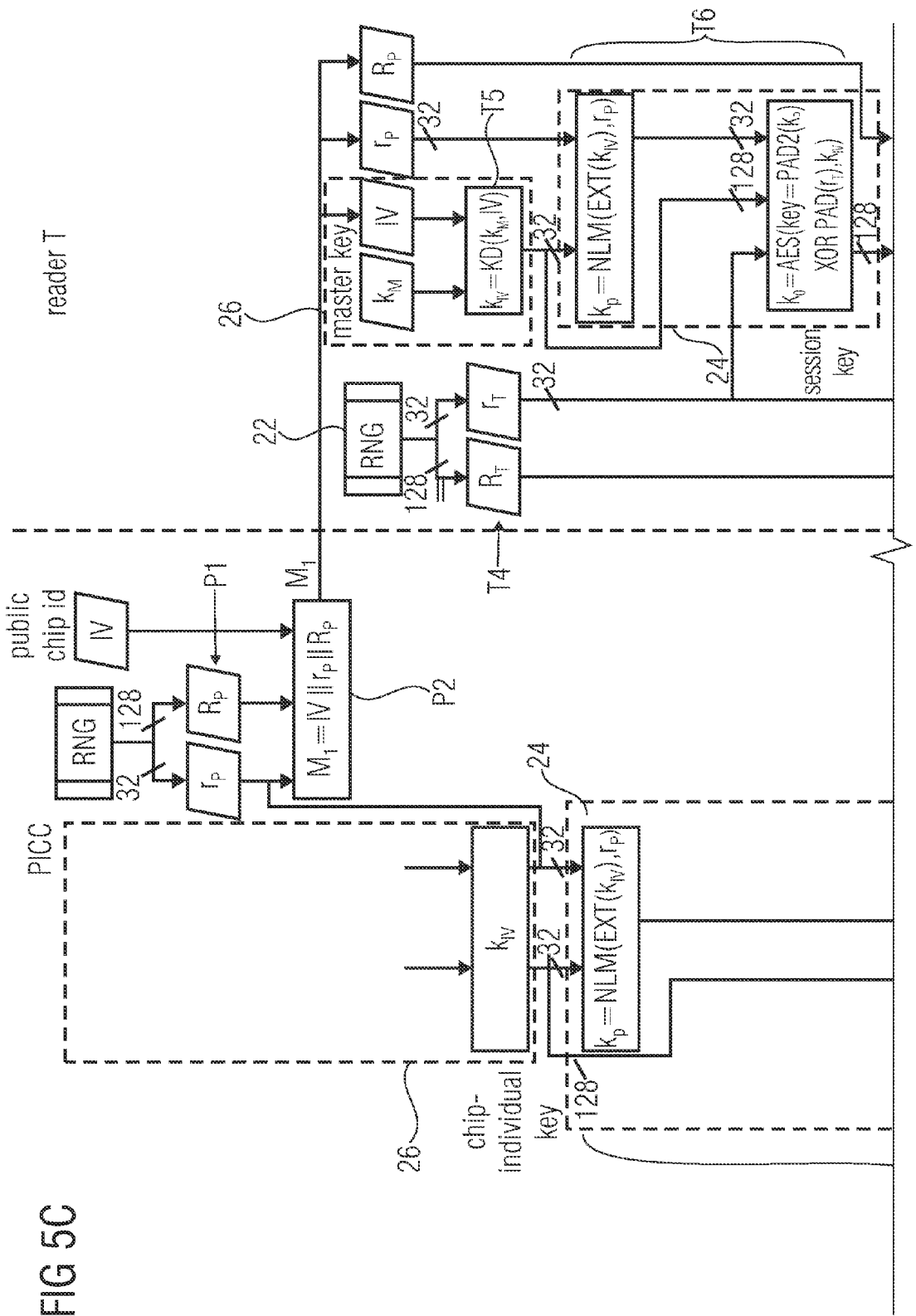
FIGS. 5c and 5d show a detailed illustration of generating a session key and mutual authentication in accordance with another embodiment of the present invention.
Figure 5D:
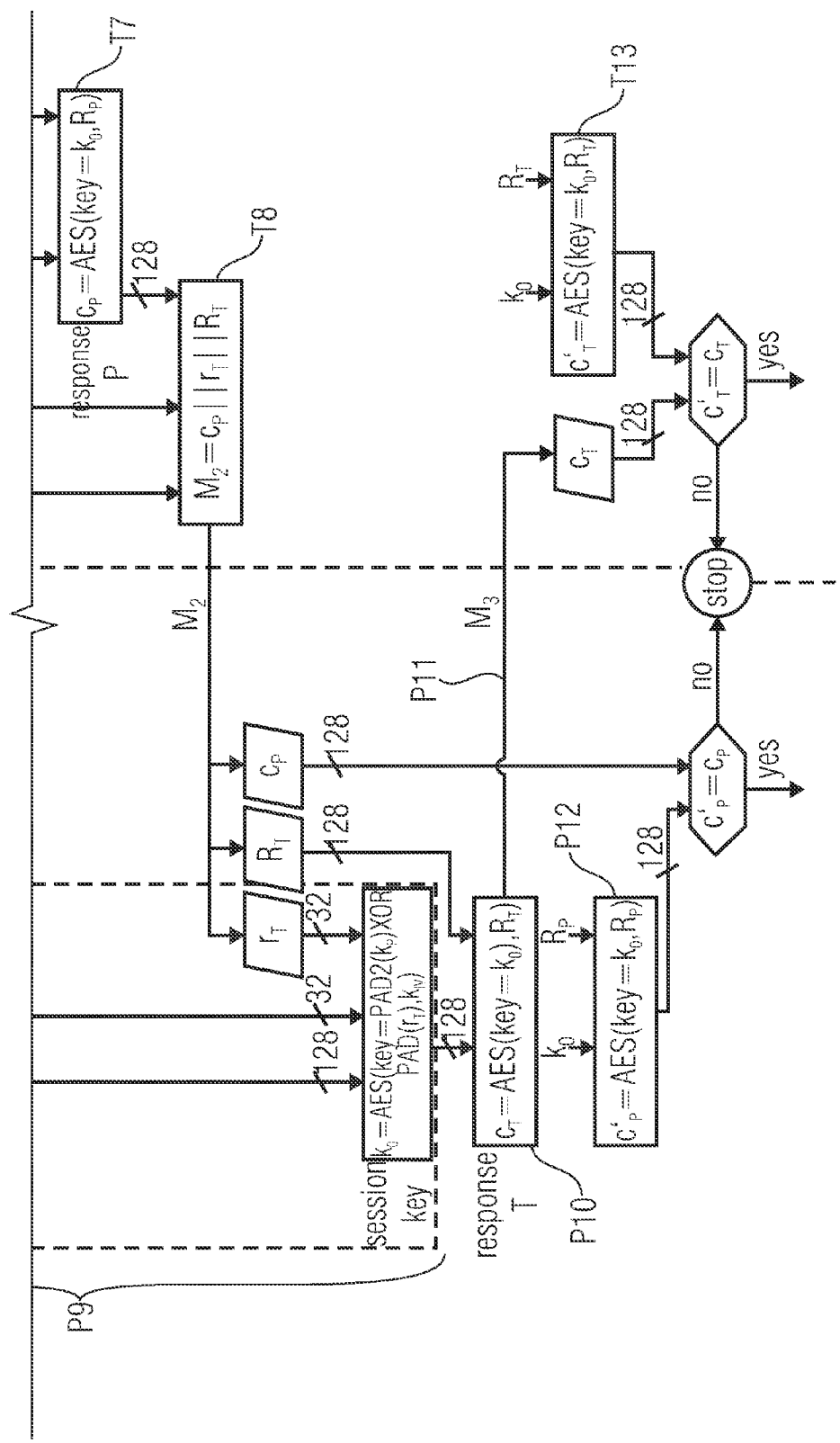

A detailed graphical illustration of the embodiments just discussed for authentication methods, in connection with hardware/software blocks involved here, on the part of both communication partners P, T is shown in FIGS. 5c and 5d.

After successful authentication 10 and successful generation of the session key $k_0$, the method may proceed with the data transfer step 12 between the two communication partners P and T. Here, the first communication partner P may make parts of its memory accessible for the second communication partner T (maybe also vice versa) so that the second communication partner T is able to read certain data blocks for which he is in possession of corresponding access rights. Equally, T is able to write certain data blocks. Thus, reading and/or programming from and to a non-volatile memory of the first communication partner P is done by P itself. However, the first communication partner P receives the commands for this from the second communication partner T.

Communication and/or data transfer between the two communication partners P and T may be organized in data frames $F_1, F_2, F_3, \ldots$ which may be transmitted both from P to T and vice versa. For reasons of security, a secret key $k_i$ is needed as an input from each data frame $F_i$. After having processed a data frame $F_i$, a new key $k_{i+1}$ which may be used for subsequent data frame $F_{i+1}$ to be transmitted can be generated. A first secret key $k_1$ for the first data frame $F_1$ to be transmitted is derived from the session key $k_0$.

All the data frames contain security-relevant data packages $D_1, D_2, D_3, \ldots$ which may be exchanged between the two communication partners P and T. Thus, it is irrelevant which direction the data packages are sent in. They may be indexed by their global occurrence, as is schematically and exemplarily illustrated in FIG. 6.

In accordance with one embodiment of the present invention, each data package $D_x$ contains a maximum of 128 bits, wherein other data package sizes are of course also conceivable. The data packages sent from the first communication partner P to the second communication partner T may contain data read out from the memory of P. Data packages in the other direction, i.e. from T to P, may contain data to be written to the memory of P. Additionally, the data packages exchanged may contain read/write commands and/or memory addresses of the data. A higher protocol layer (wrapping protocol layer) in accordance with embodiments defines which of the control data can be sent outside the data packages $D_x$ subject to the protection mechanisms described here.

The data packages may be arranged in data frames which contain consecutive data packages. All the data packages of one data frame are sent in the same direction, i.e. either from T to P or vice versa, namely from P to T, and have a special order. Organization here is done by the higher protocol layer.

In the privacy protection mode, the data packages transmitted during the data transfer 12 may be encrypted, for example by means of an AES algorithm. Each package here may exemplarily have a size of 128 bits. On the other hand, the integrity protection mode may also be used during data transfer 12 by calculating message authentication codes (MACS). In this case, the size of the data packages may be smaller than or equaling 128 bits. Every data frame may in this case include an MAC package $M_i$ which is not part of the data packages $D_1, D_2, D_3, \ldots$.

Figure 6:
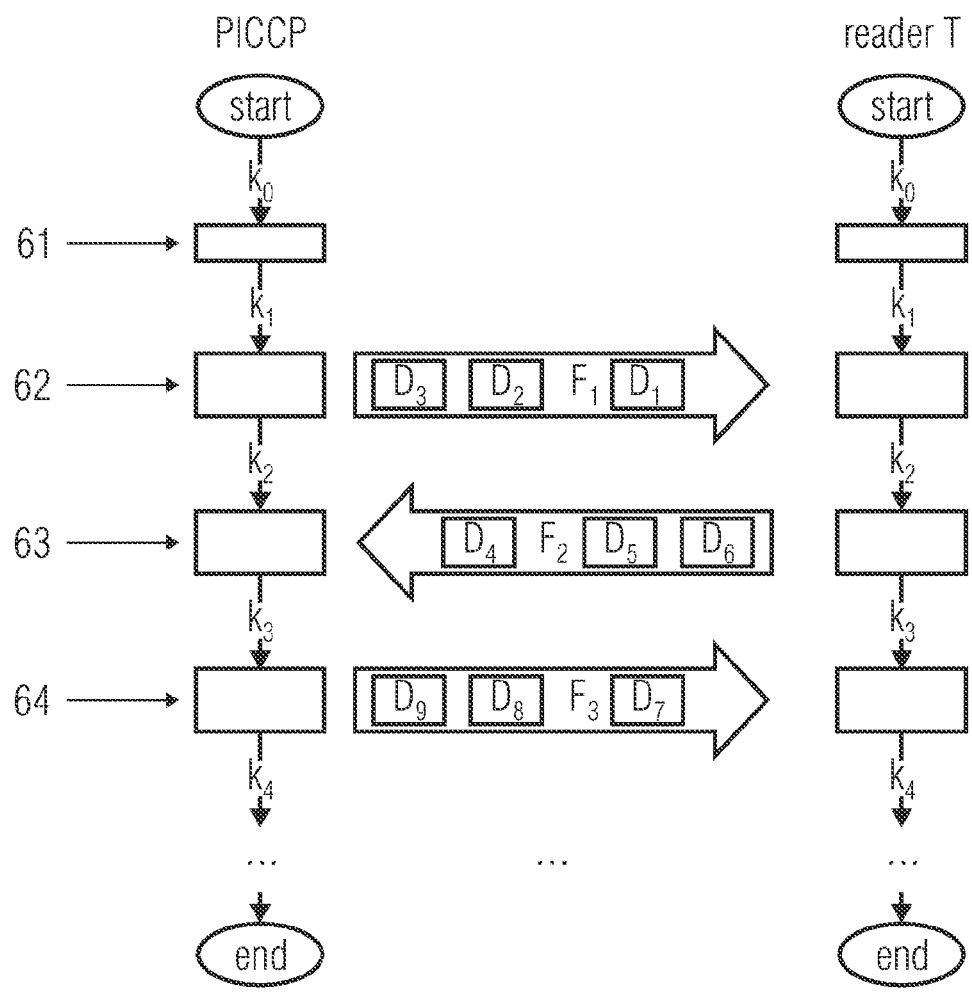
FIG. 6 shows an overview of a data exchange protocol in accordance with an embodiment of the present invention.
Figure 7:
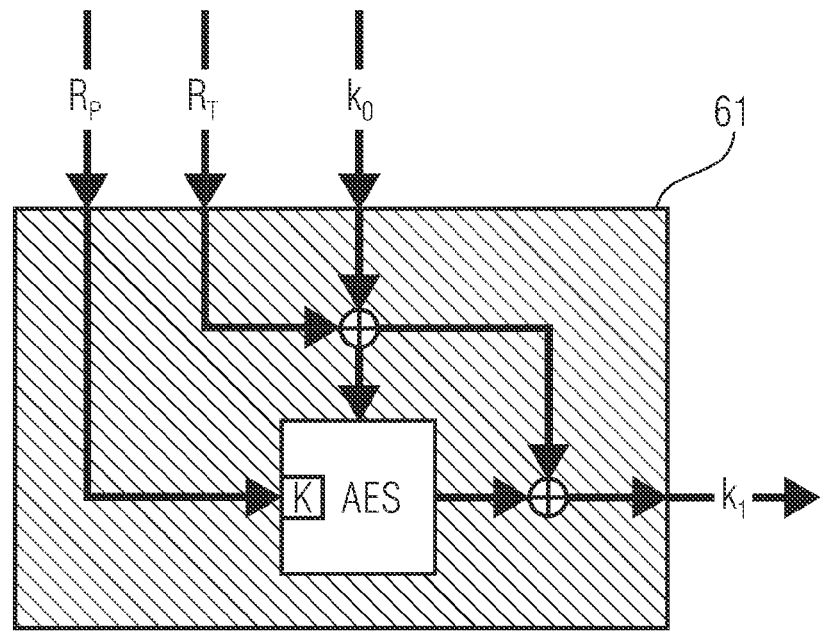
FIG. 7 shows an illustration of calculating a key, derived from the session key, for data transfer between the two communication partners in accordance with an embodiment of the present invention.

As is schematically indicated in FIG. 6, a first step 61 of the data transfer phase is deriving the first secret key $k_1$ for the first data frame $F_1$ to be transmitted based on the session key $k_0$. Step 61 is identical for both the integrity protection and privacy protection modes. Input parameters for step 61 may, as is illustrated in FIG. 7, be the session key $k_0$, and the two random challenges $R_P$ and $R_T$ having been generated during the authentication phase 10 by both the first communication partner P and the second communication partner T. In accordance with one embodiment, the first key $k_1$ may be calculated in accordance with:

$$k_1 := AES(key=R_P; k_0 \, XOR \, R_T) \quad (38)$$

as is illustrated graphically in FIG. 7a. This means that the challenge value $R_P$ may be used as a key for an AES encryption in order to encrypt an XOR concatenation of the challenge value $R_T$ and the session key $k_0$ and obtain the first derived key $k_1$ based on the AES encryption.

In accordance with another embodiment, the first key $k_1$ may also be calculated in accordance with:

$$k_1 := AES(key=R_P; k_0 \, XOR \, R_T) XOR (k_0 \, XOR \, R_T) \quad (39)$$

as is illustrated graphically in FIG. 7b.

In the integrity protection mode, every data frame $F_i$ can be provided with a check part (MAC) $M_i$ for authenticating the data frame, wherein the check part $M_i$ is generated by means of a corresponding key $k_i$. The check part $M_i$ may exemplarily be a CBC-MAC (cipher block chaining message authentication code), an HMAC (keyed-Hash message authentication code), OMAC (one-key MAC), UMAC (message authentication code based on universal hashing), PMAC (parallelizable MAC) or CMAC (cipher-based MAC).

Figure 8:
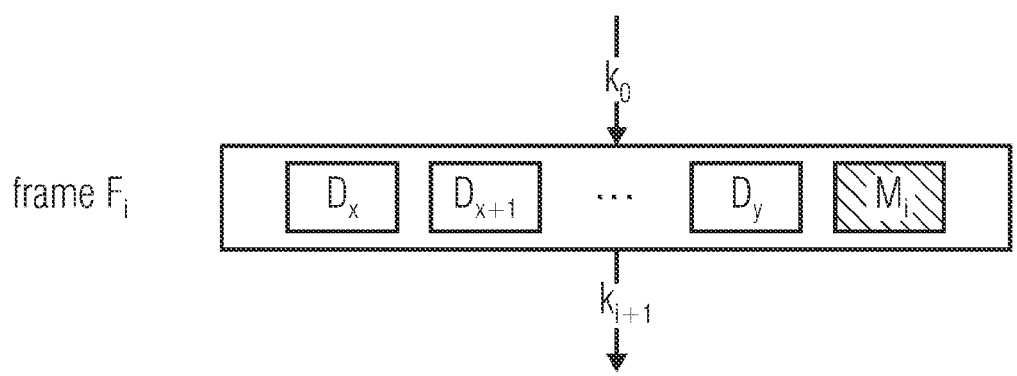
FIG. 8 shows a schematic illustration of a data frame to be transmitted.

The sequence of data packages $D_x, D_{x+1}, \ldots, D_y$ of a data frame $F_i$ is finalized by the check part $M_i$, as is schematically shown in FIG. 8. The transmitter of the frame $F_i$ uses $k_i$ and the data packages $D_x, D_{x+1}, \ldots, D_y$ to determine the check part $M_i$ and transmits $(D_x, \ldots, D_y, M_i)$ within the frame $F_i$. This means that the means 28 for using the session key $k_0$ in accordance with embodiments is adapted to calculate, for communicating to the second communication partner, a check part $M_i$ for authenticating a message $M_i$ based on the message and the session key $k_0$ or a key $k_i$ derived therefrom.

In the same manner, the receiver of the data frame $M_i$ including the contents $(D_x, \ldots, D_y, M_i)$ may be formed so as to use $k_i$ and the data packages $D_x, D_{x+1}, \ldots, D_y$ received for calculating a check part resulting therefrom. The receiver compares the resulting check part to the value $M_i$ received. If the values are identical, data transfer between the two communication partners can be continued, otherwise data transfer is to be stopped. The receiver may notify the transmitter about an MAC error.

Both communication partners P and T also compute the key $k_{i+1}$ for a data frame $F_{i+1}$ to be transmitted next (see FIG. 6, steps 62, 63, 64). In accordance with one embodiment of the present invention, the check part $M_i$ and the subsequent key $k_{i+1}$ may be calculated as follows:

$$h_x := k_i, \quad (40)$$

$$h_{x+1} := AES(key = h_x; D_x) XOR \, D_x,$$

$$h_{x+2} := AES(key = h_{x+1}; D_{x+1}) XOR \, D_{x+1},$$

-continued $$h_{x+3} := AES(\text{key} = h_{x+2}; D_{x+2}) XOR D_{x+2},$$

...

$$h_{y+1} := AES(\text{key} = h_y; D_y) XOR D_y,$$

$$k_{i+1} := h_{y+1},$$

$$M'_i := AES(\text{key} = k_i; k_{i+1}) XOR k_{i+1},$$

$$M_i := EXT(M'_i)$$

If the size of a data package $D_x$ is less than 128 bits, the respective data package $D_x$ can be padded with zeros so as to obtain a size of 128 bits. The padded data package $D_x$ may then be used as an input for the AES block encryption and/or the XOR operations.

Figure 9:
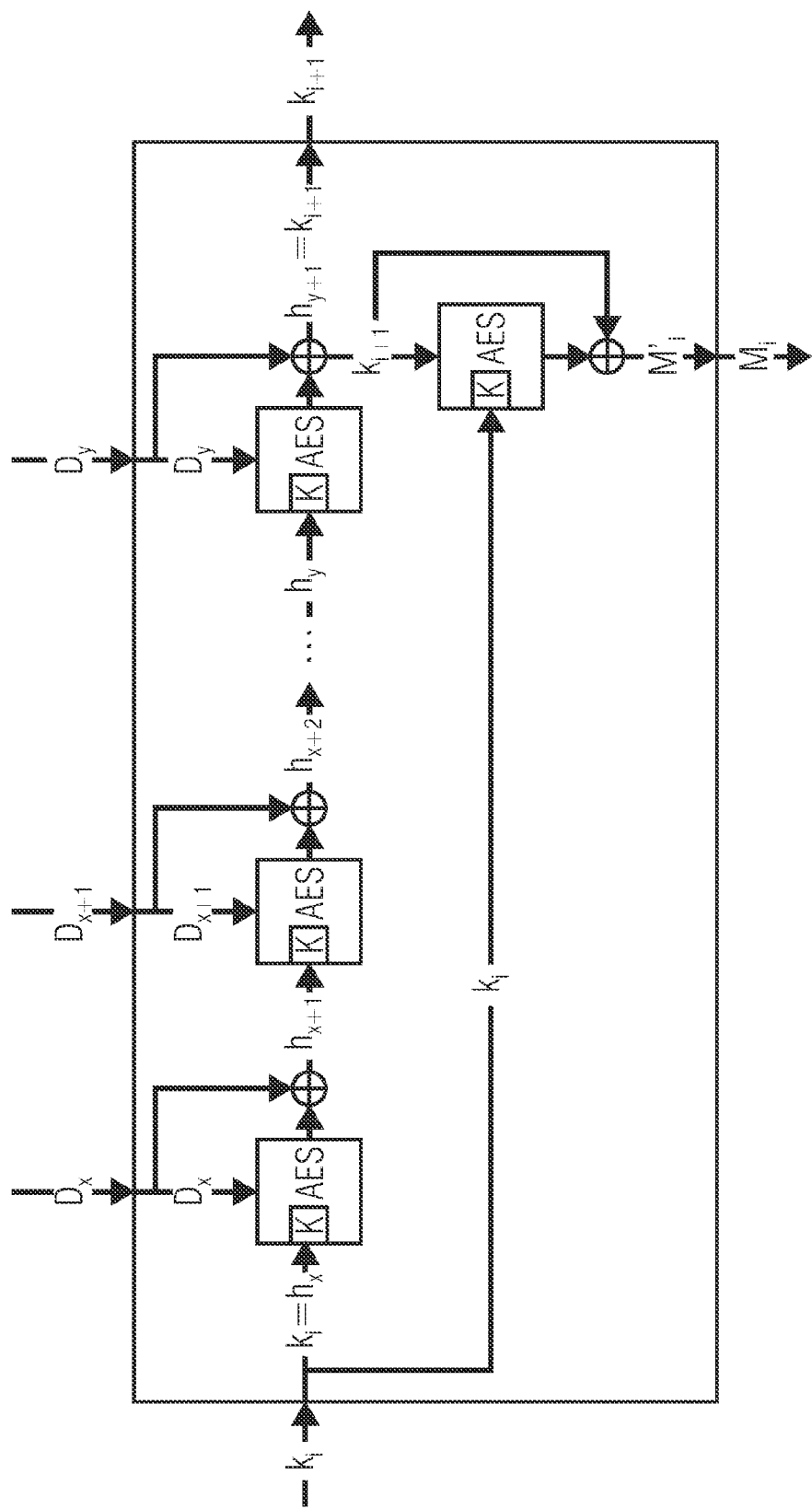
FIG. 9 shows a schematic illustration of generating a check part for authenticating a message in accordance with an embodiment of the present invention.

Generation of the check value $M_i$ and the subsequent key $k_{i+1}$ is again illustrated graphically in FIG. 9.

It becomes clear from FIG. 9 that the subsequent key $k_{i+1}$ is determined from the predecessor key $k_i$ and the individual data packages $D_x, D_{x+1}, \ldots, D_y$ of the data frame $F_i$. Thus, a first data package $D_x$ is block-encrypted using the predecessor key $k_i$, the result of this block encryption is XOR-operated again using the first data package $D_x$, wherein the result of the concatenation in turn is used as a key for block-encrypting the second data package $D_{x+1}$ in order to concatenate the result of this block encryption in turn with the second data package $D_{x+1}$ and use the result of this concatenation in turn as a key for the subsequent data package $D_{x+2}$, etc.

The check part $M_i$ is formed by using the predecessor key $k_i$ as a key for encrypting the subsequent key $k_{i+1}$ in accordance with AES block encryption. The result of this encryption may then be XOR-concatenated with $k_{i+1}$ so as to obtain the MAC check value $M_i$. This means that, in accordance with one embodiment of the present invention, the means 28 for using the session key is adapted to calculate a check part $M_i$ of a current message $F_i$ to be transferred based on a current key $k_i$ derived from the session key $k_0$ and a subsequent key $k_{i+1}$ for a message $F_{i+1}$ to be transferred subsequently, the subsequent key $k_{i+1}$ being dependent on the derived current key $k_i$ and the current message $F_i$ to be transferred.

Figure 10:
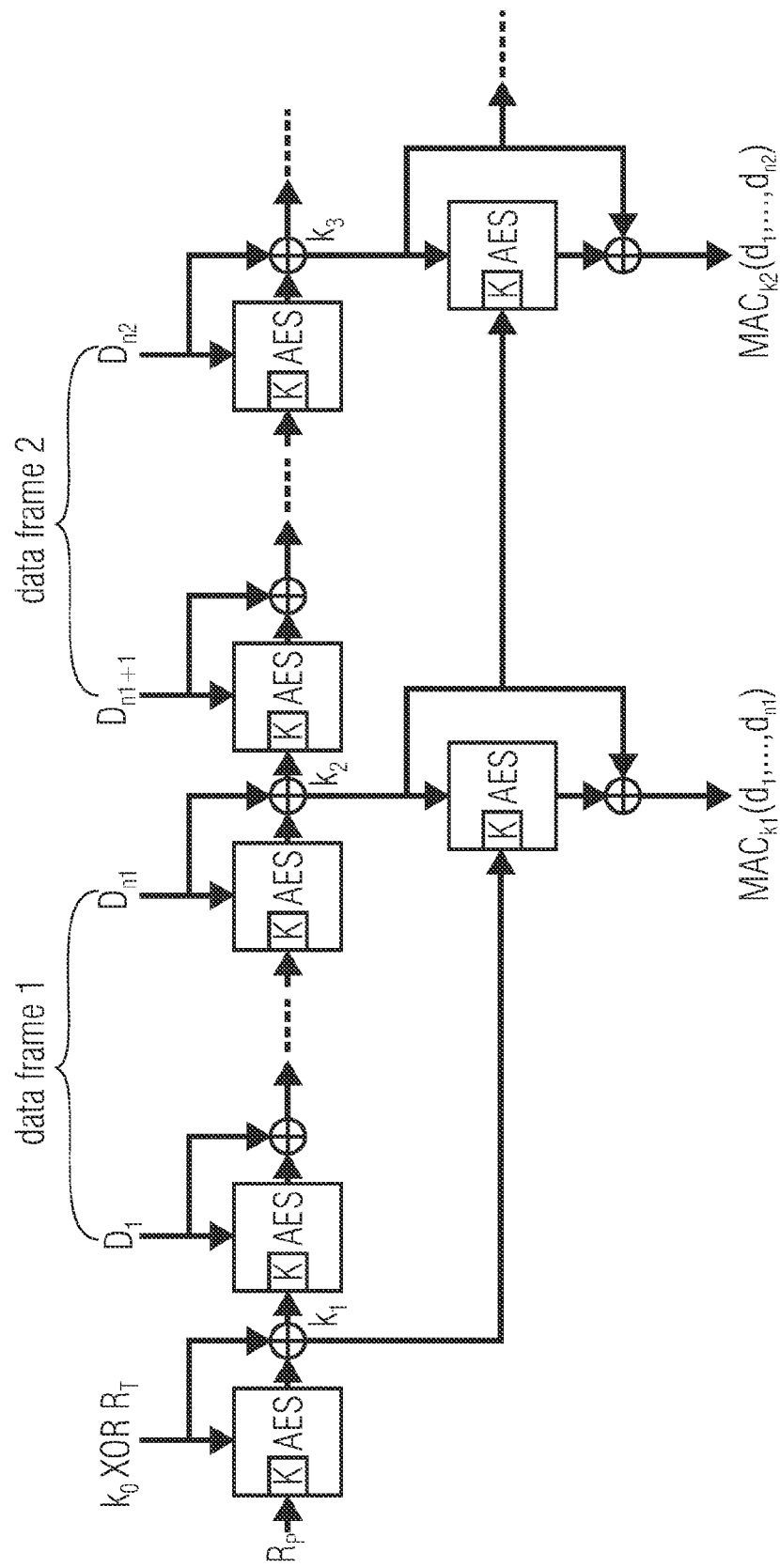
FIG. 10 shows a schematic illustration of generating successive check parts for authenticating successive messages in accordance with an embodiment of the present invention.

FIG. 10 shows an entire flow of the integrity protection mode for two data frames to be transmitted, starting at generating the first key $k_1$ based on the session key $k_0$.

Figure 11:
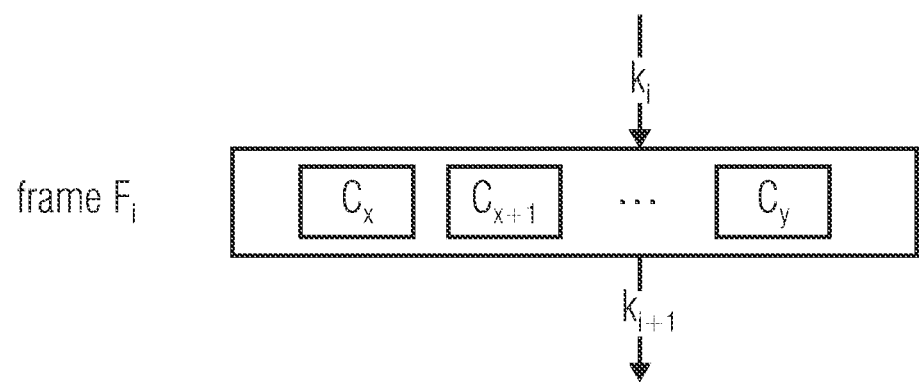
FIG. 11 shows a schematic illustration of an encrypted data frame.

In the privacy protection mode, every data frame $F_i$ is secured by encrypting the data blocks $D_x$ to form encrypted blocks $C_j$, the key $k_i$ being used here. This procedure is schematically shown in FIG. 11.

The transmitter of the data frame $F_i$ uses $k_i$ and the data packages $D_x, D_{x+1}, \ldots D_y$, encrypts every data package $D_j$ to form an encrypted package $C_j$ and transmits $(C_x, \ldots, C_y)$ within the data frame $F_i$. The receiver of the data frame $F_i$ containing $(C_x, \ldots, C_y)$ also uses the key $k_i$ and the encrypted $C_x, \ldots, C_y$ in order to recover the unencrypted packages $D_x, D_{x+1}, \ldots D_y$. Both communication partners calculate the subsequent key $k_{i+1}$ for the subsequent data frame $F_{i+1}$. There are different procedures for processing longer messages. The data may at first be separated into data packages $D_x$, the size of which is predetermined by the encryption algorithm (such as, e.g., 128 bits). The electronic code book mode (ECB) and cipher block chaining mode (CBC) modes of operation necessitate entire data packages. Thus, the last data package $D_y$ may be padded with fill data. The data packages may subsequently be encrypted one after the other. In a frequently employed CBC method, the result of encrypting a data package, the cipher of the data package encrypted before is concatenated or chained with the following data package. The calculations of the transmitter for obtaining $C_j$ and $k_{i+1}$ in accordance with one embodiment are as follows:

$$h_x := k_i, \quad (41)$$

$$h_x := AES(\text{key} = h_{x-1}; q) XOR q,$$

$$C_x := AES(\text{key} = h_x; D_x)$$

$$h_{x+1} := AES(\text{key} = h_x; q) XOR q,$$

$$C_{x+1} := AES(\text{key} = h_{x+1}; D_{x+1}),$$

...

$$h_y := AES(\text{key} = h_{y-1}; q) XOR q,$$

$$C_y := AES(\text{key} = h_y; D_y),$$

$$k_{i+1} := h_y$$

Figure 12:
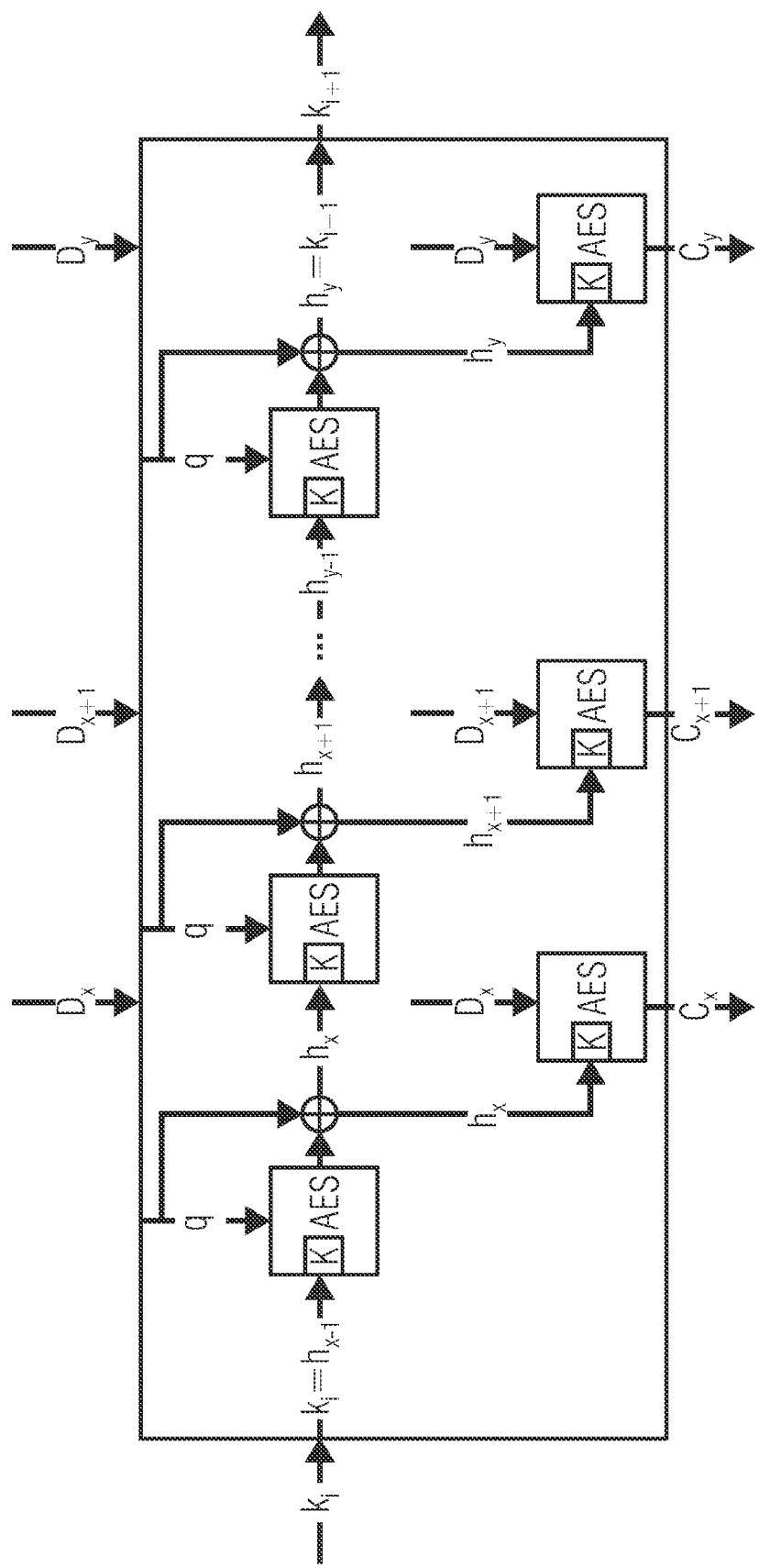
FIG. 12 shows a schematic illustration of encrypting a data frame to be transmitted in accordance with an embodiment of the present invention.

The value q thus exemplarily represents a 128-bit value which may be defined as desired, but then remains constant. In accordance with embodiments, the size of a data package $D_x$ may be 128 bits. Padding with zeros in order to reach this size may be performed by a higher wrapping protocol layer. The structure of key generation in the privacy protection mode, which is graphically illustrated in FIG. 12, is, in accordance with embodiments, identical to key generation in the integrity protection or MAC mode. A comparison of FIGS. 9 and 12 reveals that, compared to the MAC mode, in the privacy protection mode $D_{x+j}$ is only substituted by the constant q. This procedure offers the advantage that a reduction in hardware resources, for example in the form of additional control and data paths, can be avoided.

Figure 13:
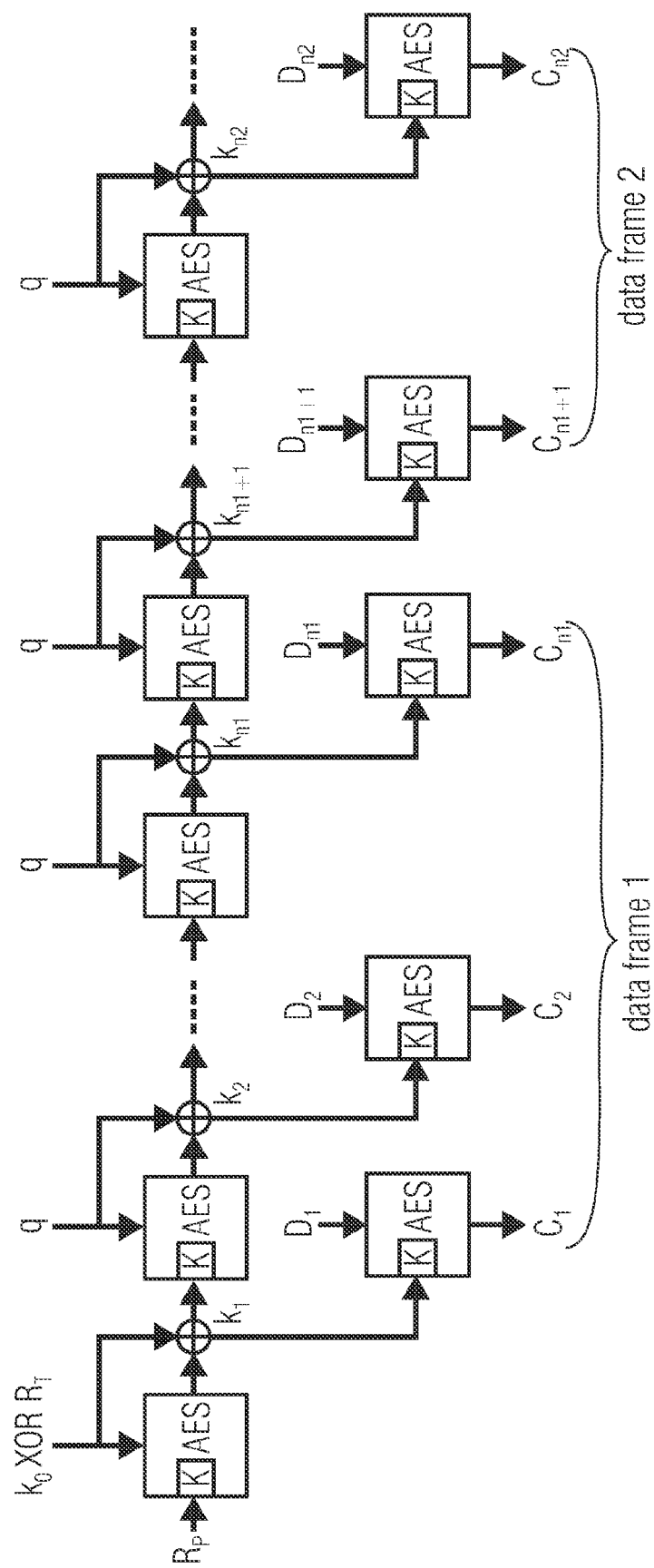
FIG. 13 shows a schematic illustration of encrypting data frames to be transmitted successively in accordance with an embodiment of the present invention.

In the same way as FIG. 10 for the MAC mode, FIG. 13 shows an entire data flow for two data frames to be transmitted for the privacy protection mode, wherein generating the first key $k_1$ based on the session key $k_0$ is started with.

Figure 14:
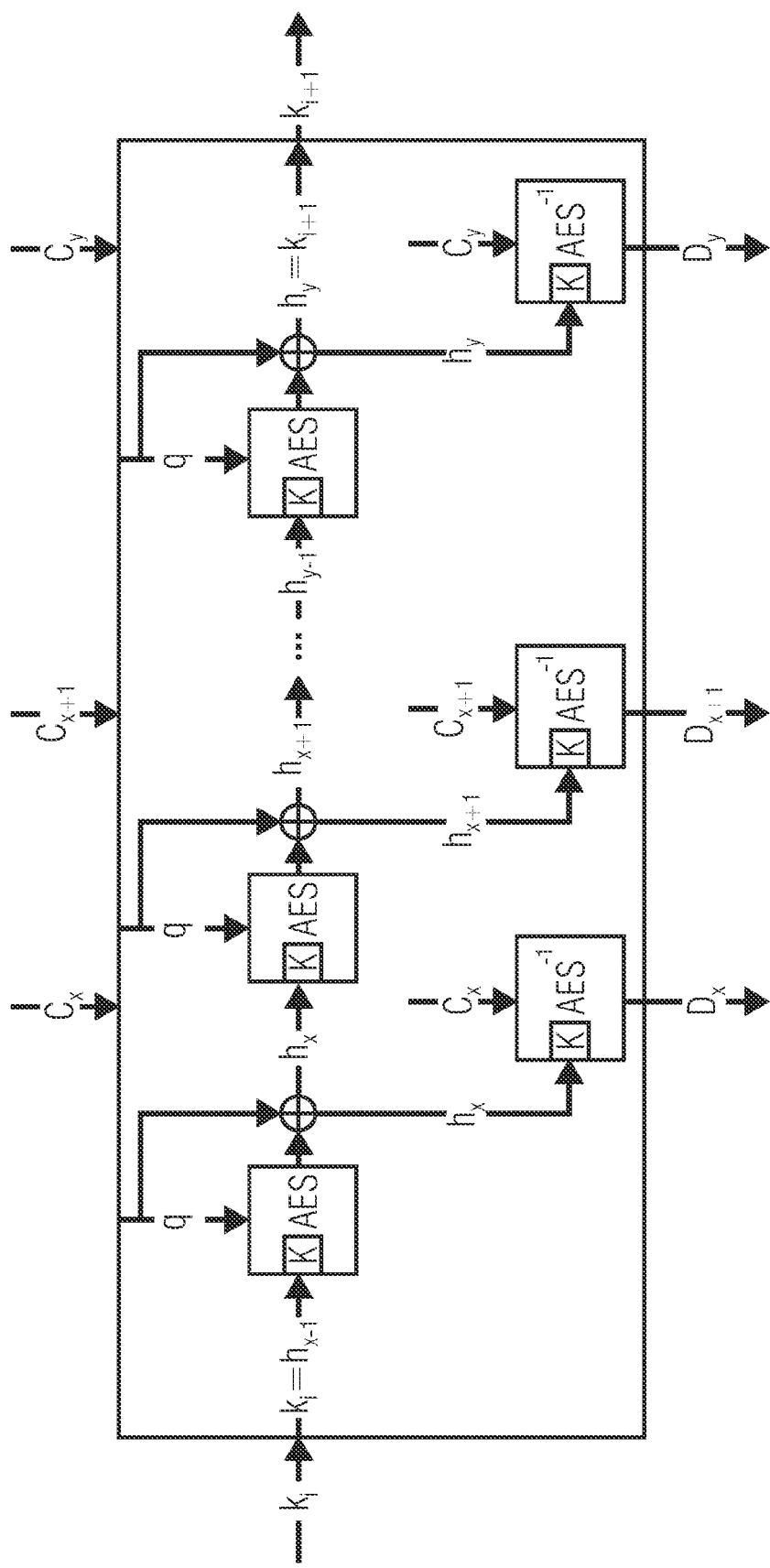
FIG. 14 shows a schematic illustration of decrypting a data frame received in accordance with an embodiment of the present invention.

In analogy to FIG. 12, FIG. 14 shows a scheme for decrypting the encrypted packages $C_x, \ldots, C_y$ of the data frame $F_i$ on the part of a receiver of the data frame. The key calculation of keys $k_i$ and $k_{i+1}$, and all the intermediate keys $h_{x-1}, h_x, h_{x+1}, \ldots$, located in between takes place in an identical manner to that on the part of the transmitter, i.e. in accordance with equation (41). For decrypting the encrypted packages $C_x$, the intermediate keys $h_x$ determined are used as a key for block decryption $AES^{-1}$ which is inverse to block encryption AES:

$$h_x := k_i, \quad (42)$$

$$h_x := AES(\text{key} = h_{x-1}; q) XOR q,$$

$$D_x := AES^{-1}(\text{key} = h_x; C_x),$$

$$h_{x+1} := AES(\text{key} = h_x; q) XOR q,$$

$$D_{x+1} := AES^{-1}(\text{key} = h_{x+1}; C_{x+1}),$$

...

$$h_y := AES(\text{key} = h_{y-1}; q) XOR q,$$

$$D_y := AES^{-1}(\text{key} = h_y; C_y),$$

$$k_{i+1} := h_y$$

Since both communication partners P and T generally act as both transmitter and receiver, in accordance with embodiments, the means 28 for using the session key is adapted to encrypt/decrypt a current key $k_{i+1}$ for a current data block $D_{i+1}/C_{i+1}$ to be encrypted/decrypted, based on a previous key $k_i$ for a data block $D_i/C_i$ to be encrypted/decrypted before and a predetermined value q.

In summary, embodiments of the present invention are firstly aimed at secure mutual authentication of two communication partners P and T. Thus, in accordance with embodiments, a first communication partner may be a so-called proximity card P and the second communication partner a corresponding reader T. Secondly, embodiments of the present invention are aimed at ensuring integrity protection of messages exchanged between the two communication partners. Thirdly, in accordance with embodiments, protection of privacy of the messages exchanged is to be ensured. Thus, in accordance with embodiments, the two last goals are mutually exclusive, i.e. the communication partners may, after secure mutual authentication 10, consent to either a data transfer mode 12 including integrity protection or a data transfer mode including privacy protection. As a basic prerequisite, both communication partners T and P share common secret information $k_{IV}$, in accordance with the settings of private-key cryptography. In accordance with embodiments, the AES including a key length of 128 bits may be used for block encryption. However, other block encryption algorithms and other key lengths are also conceivable.

Embodiments of the present invention are able to inherently increase security against side-channel attacks. This allows reducing hardware-specific measures in an underlying encryption module, in particular an AES hardware module. This may exemplarily result in proximity cards of considerably reduced sizes.

In one embodiment, in the device for generating a session key, encryption is block encryption. Block encryption may be based on the Advanced Encryption Standard (AES).

In one embodiment, in the device for generating a session key, the secret information $k_{IV}$ may be determined by means of a key derivation function (KD) based on an apparatus-specific identification and a general key $k_M$.

Depending on the circumstances, the inventive methods may be implemented in either hardware or software. The implementation may be on a digital storage medium, for example on a DVD, CD or disc having control signals which can be read out electronically, which can operate with a programmable computer system such that the respective method will be executed. Generally, the invention thus also includes a computer program product comprising a program code, stored on a machine-readable carrier, for performing the respective inventive method when the computer program product runs on a computer. In other words, the invention may also be realized as a computer program for performing a method for generating a session key when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A key-generating apparatus for generating a session key which is known to a first communication apparatus and a second communication apparatus, for the first communication apparatus, from secret information which may be determined by the first and second communication apparatuses, the key-generating apparatus comprising:
   a first instruction module configured to calculate the session key using a concatenation of at least a part of a random number and a part of the secret information;
   a second instruction module configured to use the session key for communication with the second communication apparatus;
   a third instruction module configured to determine at least a first part of the random number in a random or pseudo-random manner;
   wherein at least one of the first instruction module, the second instruction module and the third instruction module comprises a hardware implementation; and
   either:
   wherein the third instruction module is configured to determine a first random number in a random or pseudo-random manner and acquire a second random number from the second communication apparatus, wherein the first instruction module is configured to acquire the session key based on a second encryption of a value derived from a first encryption with a value derived from the second random number, and wherein a value derived from a non-linear concatenation of the first random number and the part of the secret information is used as a key for the first encryption to encrypt the secret information or a value derived from the secret information and acquire the session key based on the first and second encryptions,
   or
   wherein the third instruction module is configured to determine a first random number in a random or pseudo-random manner and acquire a second random number from the second communication apparatus, and wherein the first instruction module is configured to calculate the session key based on an encryption of a value derived from the secret information with a key derived from the first and second random numbers.

2. The key-generating apparatus of claim 1, wherein the third instruction module is configured to acquire a second part of the random number from the second communication apparatus.

3. The key-generating apparatus of claim 1, wherein the first instruction module is configured to calculate the session key using a non-linear concatenation of the at least one part of the random number and the part of the secret information.

4. The key-generating apparatus of claim 3, wherein the first instruction module is configured to use a value derived from the non-linear concatenation as a key for encryption in order to encrypt the secret information or a value derived from the secret information and acquire the session key based on the encryption.

5. The key-generating apparatus of claim 3, wherein the first instruction module is configured to use the secret information or a value derived from the secret information as a key for encryption to encrypt a value derived from the non-linear concatenation and acquire the session key based on the encryption.

6. The key-generating apparatus of claim 1, wherein the second instruction module is configured to calculate, for communication with the second communication apparatus, a check part for authenticating a message based on the message and the session key or a key derived from the session key.

7. The key-generating apparatus of claim 6, wherein the second instruction module is configured to calculate a check part of a current message to be transferred based on a current key derived from the session key and a subsequent key for a subsequent message to be transferred, the subsequent key being dependent on the current key derived and the current message to be transferred.

8. The key-generating apparatus of claim 6, wherein the second instruction module is configured to use block encryption in accordance with the Advanced Encryption Standard for calculating the check part.

9. The key-generating apparatus of claim 1, wherein the second instruction module is configured to encrypt/decrypt, for communication with the second communication apparatus, data blocks of a message based on the session key or a key derived therefrom.

10. The key-generating apparatus of claim 9, wherein the second instruction module is configured to encrypt/decrypt a current key for a current data block to be encrypted/decrypted based on a previous key for a previous data block to be encrypted/decrypted and a predetermined value.

11. The key-generating apparatus of claim 10, wherein the second instruction module is configured to use block encryption in accordance with the Advanced Encryption Standard for calculating the current key.

12. The key-generating apparatus of claim 1, wherein the first instruction module is configured to encrypt the secret information using an encryption key derived from a result of the concatenation of at least the part of the random number and the part of the secret information.

13. The key-generating apparatus of claim 12, wherein the first instruction module is configured to encrypt a result of the encryption using a further encryption key derived from a further random number received from the second communication apparatus to obtain the session key as the result of the further encryption.

14. A method for generating a session key which is known to a first communication apparatus and a second communication apparatus, for the first communication apparatus, from secret information which may be determined by the first and second communication apparatuses, the method comprising:
acquiring a random number;
calculating, in a first instruction module, the session key using a concatenation of at least a part of the random number and a part of the secret information;
using, by a second instruction module, the session key for communication with the second communication apparatus;
wherein at least one of the first instruction module and the second instruction module comprises a hardware implementation; and
either:
wherein, when acquiring the random number, a first random number is determined based on a non-linear concatenation of a random number determined in a random or pseudo-random manner or a value derived from the random number and a part of the secret information, and a second random number is acquired from the second communication apparatus, and wherein calculating the session key is based on block encryption of a value derived from the secret information with a key derived from the first and second random numbers,
or
wherein, when acquiring the random number, a first random number is determined by the first communication apparatus in a random or pseudo-random manner, and a second random number is acquired from the second communication apparatus, and wherein calculating the session key is based on block encryption of the second random number with block encryption of the secret information with a non-linear concatenation of the first random number and the part of the secret information.

15. The method of claim 14, wherein the session key is generated by both the first and second communication apparatuses based on the random number and the secret information.

16. The method of claim 14, wherein the session key is used in an authentication method as a common secret for authentication between the first and second communication apparatuses.

17. The method of claim 14, wherein the authentication method is a challenge-response method for a single-sided or mutual authentication by utilizing the session key.

18. A non-transitory computer-readable medium having stored there on a computer program product comprising program code that when executed by a processor performs a method of generating a session key which is known to a first communication apparatus and a second communication apparatus, for the first communication apparatus, from secret information which may be determined by the first and second communication apparatuses, the method comprising:
acquiring a random number;
calculating the session key using a concatenation of at least a part of the random number and a part of the secret information;
using the session key for communication with the second communication apparatus when the computer program runs on a computer or microcontroller; and
either:
wherein, when acquiring the random number, a first random number is determined based on a non-linear concatenation of a random number determined in a random or pseudo-random manner or a value derived from the random number and a part of the secret information, and a second random number is acquired from the second communication apparatus, and wherein calculating the session key is based on block encryption of a value derived from the secret information with a key derived from the first and second random numbers,
or
wherein, when acquiring the random number, a first random number is determined by the first communication apparatus in a random or pseudo-random manner, and a second random number is acquired from the second communication apparatus, and wherein calculating the session key is based on block encryption of the second random number with block encryption of the secret information with a non-linear concatenation of the first random number and the part of the secret information.

19. A key-generating apparatus for generating a session key which is known to a first communication apparatus and a second communication apparatus, for the first communication apparatus, from secret information which may be determined by the first and second communication apparatuses, the key-generating apparatus comprising:

a first instruction module configured to calculate the session key using a concatenation of at least a part of a random number and a part of the secret information;

a second instruction module configured to use the session key for communication with the second communication apparatus;

wherein at least one of the first instruction module and the second instruction module comprises a hardware implementation; and either:

wherein the second instruction module is configured to calculate, for communication with the second communication apparatus, a check part for authenticating a message based on the message and the session key or a key derived from the session key, and wherein the second instruction module is configured to calculate a check part of a current message to be transferred based on a current key derived from the session key and a subsequent key for a subsequent message to be transferred, the subsequent key being dependent on the current key derived and the current message to be transferred, or wherein the second instruction module is configured to encrypt/decrypt, for communication with the second communication apparatus, data blocks of a message based on the session key or a key derived therefrom, and wherein the second instruction module is configured to encrypt/decrypt a current key for a current data block to be encrypted/decrypted based on a previous key for a previous data block to be encrypted/decrypted and a predetermined value, and wherein the second instruction module is configured to use block encryption in accordance with the Advanced Encryption Standard for calculating the current key.

20. A key-generating apparatus for generating a session key which is known to a first communication apparatus and a second communication apparatus, for the first communication apparatus, from secret information which may be determined by the first and second communication apparatuses, the key-generating apparatus comprising:

a first instruction module configured to calculate the session key using a concatenation of at least a part of a random number and a part of the secret information; and a second instruction module configured to use the session key for communication with the second communication apparatus, wherein the first instruction module is configured to encrypt the secret information using an encryption key derived from a result of the concatenation of at least the part of the random number and the part of the secret information, and wherein the first instruction module is configured to encrypt a result of the encryption using a further encryption key derived from a further random number received from the second communication apparatus to obtain the session key as the result of the further encryption, and wherein at least one of the first instruction module and the second instruction module comprises a hardware implementation.

21. A key-generating apparatus for generating a session key which is known to a first communication apparatus and a second communication apparatus, for the first communication apparatus, from secret information which may be determined by the first and second communication apparatuses, the key-generating apparatus comprising:

a first instruction module configured to calculate the session key using a concatenation of at least a part of a random number and a part of the secret information;

a second instruction module configured to use the session key for communication with the second communication apparatus;

wherein at least one of the first instruction module and the second instruction module comprises a hardware implementation; and either:

wherein the key-generating apparatus is configured for acquiring the random number, wherein in acquiring the random number, a first random number is determined based on a non-linear concatenation of a random number determined in a random or pseudo-random manner or a value derived from the random number and a part of the secret information, and a second random number is acquired from the second communication apparatus, and wherein calculating the session key is based on block encryption of a value derived from the secret information with a key derived from the first and second random numbers, or wherein the key-generating apparatus is configured for acquiring the random number, wherein in acquiring the random number, a first random number is determined by the first communication apparatus in a random or pseudo-random manner, and a second random number is acquired from the second communication apparatus, and wherein calculating the session key is based on block encryption of the second random number with block encryption of the secret information with a non-linear concatenation of the first random number and the part of the secret information.

22. A method for generating a session key which is known to a first communication apparatus and a second communication apparatus, for the first communication apparatus, from secret information which may be determined by the first and second communication apparatuses, the method comprising:

acquiring a random number;

calculating, by a first instruction module, the session key using a concatenation of at least a part of the random number and a part of the secret information;

using, by a second instruction module, the session key for communication with the second communication apparatus;

determining, by a third instruction module, at least a first part of the random number in a random or pseudo-random manner;

wherein at least one of the first instruction module, the second instruction module and the third instruction module comprises a hardware implementation; and either:

wherein the third instruction module determines a first random number in a random or pseudo-random manner and acquires a second random number from the second communication apparatus, wherein the first instruction module acquires the session key based on a second encryption of a value derived from a first encryption with a value derived from the second random number, and wherein a value derived from a non-linear concatenation of the first random number and the part of the secret information is used as a key for the first encryption to encrypt the secret information or a value derived from the secret information and acquire the session key based on the first and second encryptions, or
wherein the third instruction module determines a first random number in a random or pseudo-random manner and acquires a second random number from the second communication apparatus, and wherein the first instruction module calculates the session key based on an encryption of a value derived from the secret information with a key derived from the first and second random numbers.

23. A method for generating a session key which is known to a first communication apparatus and a second communication apparatus, for the first communication apparatus, from secret information which may be determined by the first and second communication apparatuses, the method comprising:
acquiring a random number;
calculating, by a first instruction module, the session key using a concatenation of at least a part of the random number and a part of the secret information;
using, by a second instruction module, the session key for communication with the second communication apparatus;
wherein at least one of the first instruction module and the second instruction module comprises a hardware implementation; and
either:
wherein the second instruction module calculates, for communication with the second communication apparatus, a check part for authenticating a message based on the message and the session key or a key derived from the session key, and wherein the second instruction module calculates a check part of a current message to be transferred based on a current key derived from the session key and a subsequent key for a subsequent message to be transferred, the subsequent key being dependent on the current key derived and the current message to be transferred,
or
wherein the second instruction module encrypts/decrypts, for communication with the second communication apparatus, data blocks of a message based on the session key or a key derived therefrom, and wherein the second instruction module encrypts/decrypts a current key for a current data block to be encrypted/decrypted based on a previous key for a previous data block to be encrypted/decrypted and a predetermined value, and wherein the second instruction module uses block encryption in accordance with the Advanced Encryption Standard for calculating the current key.

24. A method for generating a session key which is known to a first communication apparatus and a second communication apparatus, for the first communication apparatus, from secret information which may be determined by the first and second communication apparatuses, the method comprising:
acquiring a random number;
calculating, by a first instruction module, the session key using a concatenation of at least a part of the random number and a part of the secret information;
using, by a second instruction module, the session key for communication with the second communication apparatus;
wherein the first instruction module encrypts the secret information using an encryption key derived from a result of the concatenation of at least the part of the random number and the part of the secret information, and wherein the first instruction module encrypts a result of the encryption using a further encryption key derived from a further random number received from the second communication apparatus to obtain the session key as the result of the further encryption; and
wherein at least one of the first instruction module and the second instruction module comprises a hardware implementation.

25. A non-transitory storage medium having stored thereon a computer program product comprising program code stored on a non-transitory machine-readable carrier that when executed by a processor performs a method of generating a session key which is known to a first communication apparatus and a second communication apparatus, for the first communication apparatus, from secret information which may be determined by the first and second communication apparatuses, the method comprising:
acquiring a random number;
calculating the session key using a concatenation of at least a part of the random number and a part of the secret information;
using the session key for communication with the second communication apparatus when the computer program runs on a computer or microcontroller;
determining at least a first part of the random number in a random or pseudo-random manner; and
either:
wherein a first random number in a random or pseudo-random manner is determined and a second random number is acquired from the second communication apparatus, wherein the session key is acquired based on a second encryption of a value derived from a first encryption with a value derived from the second random number, and wherein a value derived from a non-linear concatenation of the first random number and the part of the secret information is used as a key for the first encryption to encrypt the secret information or a value derived from the secret information and acquire the session key based on the first and second encryptions,
or
wherein a first random number is determined in a random or pseudo-random manner and a second random number is acquired from the second communication apparatus, and wherein the session key is calculated based on an encryption of a value derived from the secret information with a key derived from the first and second random numbers.

26. A non-transitory storage medium having stored thereon a computer program product comprising program code stored on a non-transitory machine-readable carrier that when executed by a processor performs a method of generating a session key which is known to a first communication apparatus and a second communication apparatus, for the first communication apparatus, from secret information which may be determined by the first and second communication apparatuses, the method comprising:
acquiring a random number;
calculating the session key using a concatenation of at least a part of the random number and a part of the secret information;
using the session key for communication with the second communication apparatus when the computer program runs on a computer or microcontroller; and
either:
wherein, for communication with the second communication apparatus, a check part for authenticating a message is calculated based on the message and the session key or a key derived from the session key, and wherein a check part of a current message to be transferred is calculated based on a current key derived from the session key and a subsequent key for a subsequent message to be transferred, the subsequent key being dependent on the current key derived and the current message to be transferred, or wherein, for communication with the second communication apparatus, data blocks of a message based on the session key or a key derived therefrom are encrypted or decrypted, and wherein a current key for a current data block to be encrypted/decrypted is encrypted or decrypted based on a previous key for a previous data block to be encrypted/decrypted and a predetermined value, and wherein block encryption in accordance with the Advanced Encryption Standard is used for calculating the current key.

27. A non-transitory storage medium having stored thereon a computer program product comprising program code stored on a non-transitory machine-readable carrier that when executed by a processor performs a method of generating a session key which is known to a first communication apparatus and a second communication apparatus, for the first communication apparatus, from secret information which may be determined by the first and second communication apparatuses, the method comprising:

acquiring a random number;

calculating the session key using a concatenation of at least a part of the random number and a part of the secret information;

using the session key for communication with the second communication apparatus when the computer program runs on a computer or microcontroller; and wherein the secret information is encrypted using an encryption key derived from a result of the concatenation of at least the part of the random number and the part of the secret information, and wherein a result of the encryption is encrypted using a further encryption key derived from a further random number received from the second communication apparatus to obtain the session key as the result of the further encryption.

* * * * *